(12) United States Patent
Baba et al.

(10) Patent No.: US 8,731,304 B2
(45) Date of Patent: May 20, 2014

(54) COMPUTER-READABLE STORAGE MEDIUM STORING IMAGE PROCESSING PROGRAM, IMAGE PROCESSING METHOD, AND IMAGE PROCESSING DEVICE

(75) Inventors: Takayuki Baba, Kawasaki (JP); Shugo Nakamura, Kawasaki (JP); Masaki Ishihara, Kawasaki (JP); Masahiko Sugimura, Kawasaki (JP); Susumu Endo, Kawasaki (JP); Yusuke Uehara, Kawasaki (JP); Daiki Masumoto, Kawasaki (JP); Shigemi Nagata, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/403,466

(22) Filed: Feb. 23, 2012

(65) Prior Publication Data

US 2012/0230589 A1 Sep. 13, 2012

(30) Foreign Application Priority Data

Mar. 7, 2011 (JP) ................... 2011-049304

(51) Int. Cl.
*G06K 9/46* (2006.01)

(52) U.S. Cl.
USPC ........... 382/192; 382/100; 382/103; 382/107; 382/181; 382/190; 382/195; 382/199; 382/203; 382/236; 382/218

(58) Field of Classification Search
CPC . G06K 9/38; G06K 9/00288; G06K 9/00604; G06K 9/2054
USPC ......... 382/192, 100, 103, 107, 181, 190, 195, 382/199, 203, 236, 218
See application file for complete search history.

(56) References Cited

U.S. PATENT DOCUMENTS 6,738,631 B1 * 5/2004 Adler et al. ................ 455/456.6

FOREIGN PATENT DOCUMENTS

JP 2008-181515 8/2008

OTHER PUBLICATIONS

Takayuki Baba, et al. "Object-Driven Group Annotation", IEEE 17th International Conference on Image Processing, Sep. 26-29, 2010, pp. 2641-2644.
Tomasz Malisiewicz, et al. "Recognition by Association via Learning Per-exemplar Distances", The Robotics Institute, Carnegie Mellon University, pp. 1-8, Jun. 2008.

* cited by examiner

*Primary Examiner* — Mike Rahmjoo
(74) *Attorney, Agent, or Firm* — Staas & Halsey LLP

(57) ABSTRACT

A computer-readable storage medium storing an image processing program that causes a computer to execute a process includes acquiring the same object identification information included in a plurality of image data items by referring to a storage unit that stores each of the image data items, object identification information that identifies an object included in the image data item, and a location information item that identifies a location of the object in the image data item in association with one another; acquiring the location of the object identified by the acquired object identification information in each of the image data items by referring to the storage unit; computing a difference between the acquired location information items; comparing the difference between the location information items with a predetermined location threshold value; and determining whether the image data items are to be in the same group.

13 Claims, 16 Drawing Sheets

FIG. 4A

| SET OF VIDEO DATA ITEMS ||
|---|---|
| VIDEO ID | M1 |
| VIDEO ID | M2 |
| ⋮ | ⋮ |

FIG. 4B

| VIDEO DATA M1 ||
|---|---|
| TENTATIVE GROUP ID | G1 |
| TENTATIVE GROUP ID | G2 |
| TENTATIVE GROUP ID | G3 |
| TENTATIVE GROUP ID | G4 |
| ⋮ | ⋮ |

FIG. 4C-1

| TENTATIVE GROUP G1 ||
|---|---|
| FRAME ID | 1 |
| FRAME ID | 2 |
| ⋮ | ⋮ |
| FRAME ID | P1 |

FIG. 4C-2

| TENTATIVE GROUP G2 ||
|---|---|
| FRAME ID | P1+1 |
| FRAME ID | P1+2 |
| ⋮ | ⋮ |
| FRAME ID | P2 |

| FRAME 1 ||
|---|---|
| OBJECT ID | T1 |
| OBJECT ID | T2 |
| ⋮ | ⋮ |

FIG. 4E-1

| OBJECT T1 ||
|---|---|
| OBJECT NAME | PERSON |
| LOCATION INFORMATION ||
| FEATURE INFORMATION ||

FIG. 4E-2

| OBJECT T2 ||
|---|---|
| OBJECT NAME | WALL |
| LOCATION INFORMATION ||
| FEATURE INFORMATION ||

...

FIG. 5A
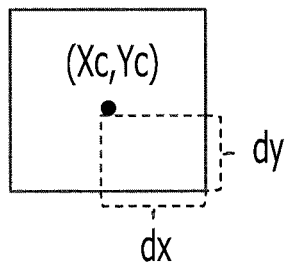
FIG. 5B
| OBJECT T1 ||
|---|---|
| OBJECT NAME | PERSON |
| CENTRAL COORDINATES | $(X_c, Y_c)$ |
| DISTANCE FROM CENTRAL POINT | $d_x, d_y$ |
FIG. 5C
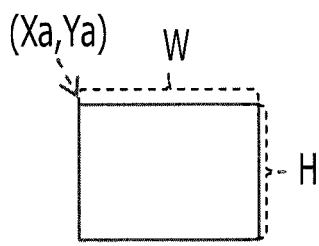
FIG. 5D
| OBJECT T1 ||
|---|---|
| OBJECT NAME | PERSON |
| COORDINATES OF VERTEX | $(X_a, Y_a)$ |
| WIDTH, HEIGHT | $W, H$ |
FIG. 5E
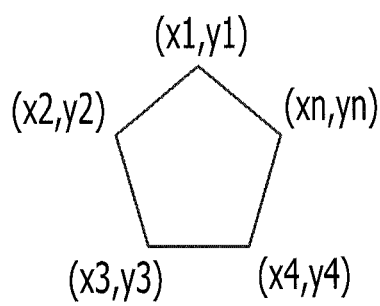
FIG. 5F
| OBJECT T1 ||
|---|---|
| OBJECT NAME | PERSON |
| COORDINATES OF VERTEX 1 | $(x_1, y_1)$ |
| ⋮ | ⋮ |
| COORDINATES OF VERTEX n | $(x_n, y_n)$ |

| OBJECT NAME | FOREGROUND/ BACKGROUND | SIMILARITY |
|---|---|---|
| WALL | BACKGROUND | HIGH |
| FLOOR | BACKGROUND | HIGH |
| WORKING BENCH | BACKGROUND | HIGH |
| ... | ... | ... |

| OBJECT NAME | FOREGROUND/ BACKGROUND | SIMILARITY |
|---|---|---|
| WALL | BACKGROUND | HIGH |
| FLOOR | BACKGROUND | LOW |
| WORKING BENCH | BACKGROUND | LOW |
| ... | ... | ... |

FIG. 9A

| OBJECT NAME | APPEARANCE RATIO RT | MOVEMENT RATIO RD | FOREGROUND/ BACKGROUND | LOCATION OF OBJECT | AVERAGE VECTOR OF FEATURE |
|---|---|---|---|---|---|
| FLOOR | 1 | 0.0 | BACKGROUND | Pf | Vf |
| WALL | 1 | 0.0 | BACKGROUND | Pw | Vw |
| WORKING BENCH | 1 | 0.0 | BACKGROUND | Pd | Vd |
| PERSON | 0.9 | 0.5 | FOREGROUND | - | - |
| PART A | 0.8 | 0.0 | BACKGROUND | Pp | Vp |
| ⋮ | ⋮ | ⋮ | ⋮ | ⋮ | ⋮ |

FIG. 9B

| OBJECT NAME | FOREGROUND/BACKGROUND |
|---|---|
| PERSON | FOREGROUND |
| PART | FOREGROUND |
| FLOOR | BACKGROUND |
| WALL | BACKGROUND |
| WORKING BENCH | BACKGROUND |
| MACHINE TOOL | BACKGROUND |
| ⋮ | ⋮ |

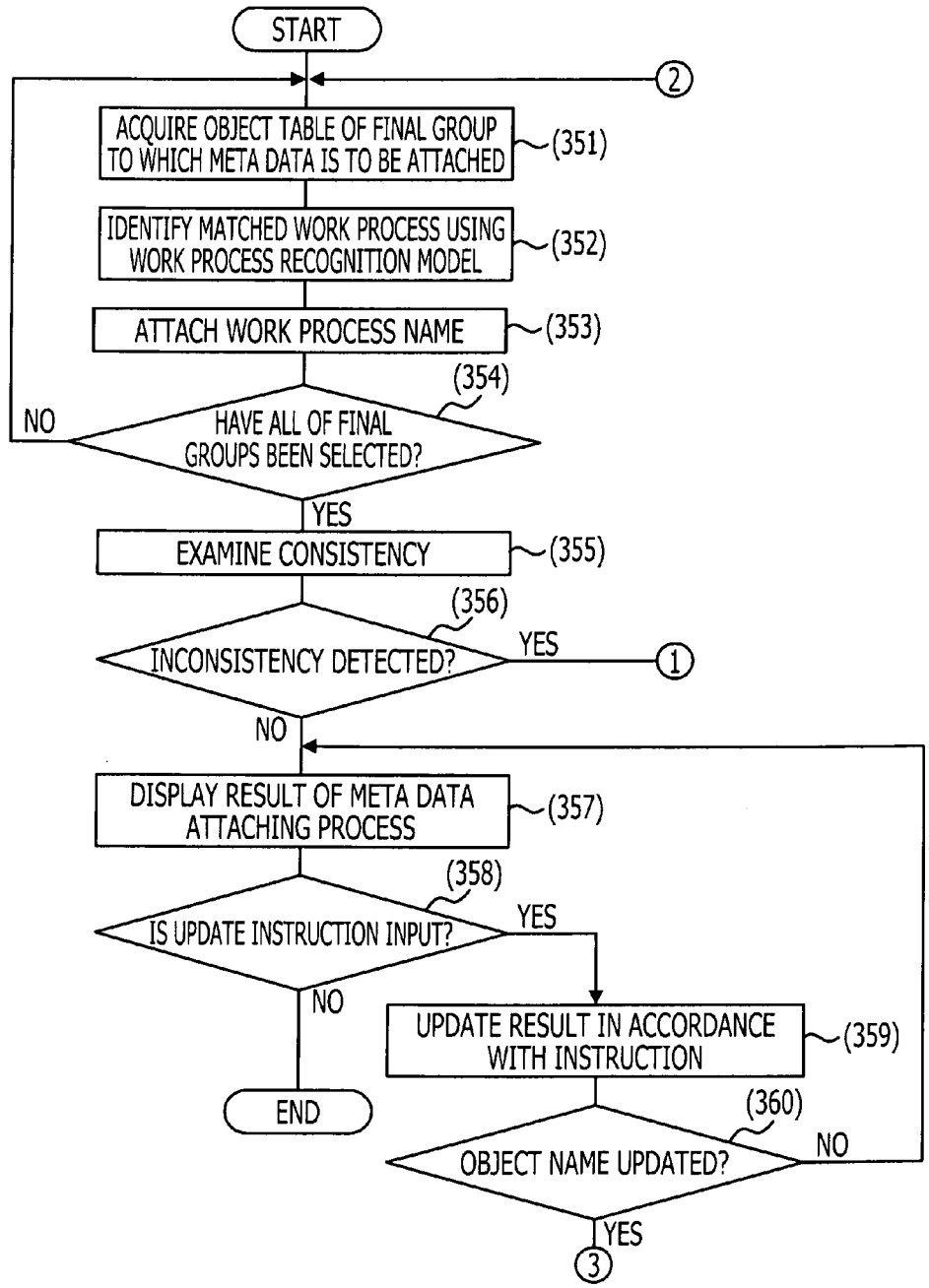

| FIG. 12A |
|----------|
| FIG. 12B |

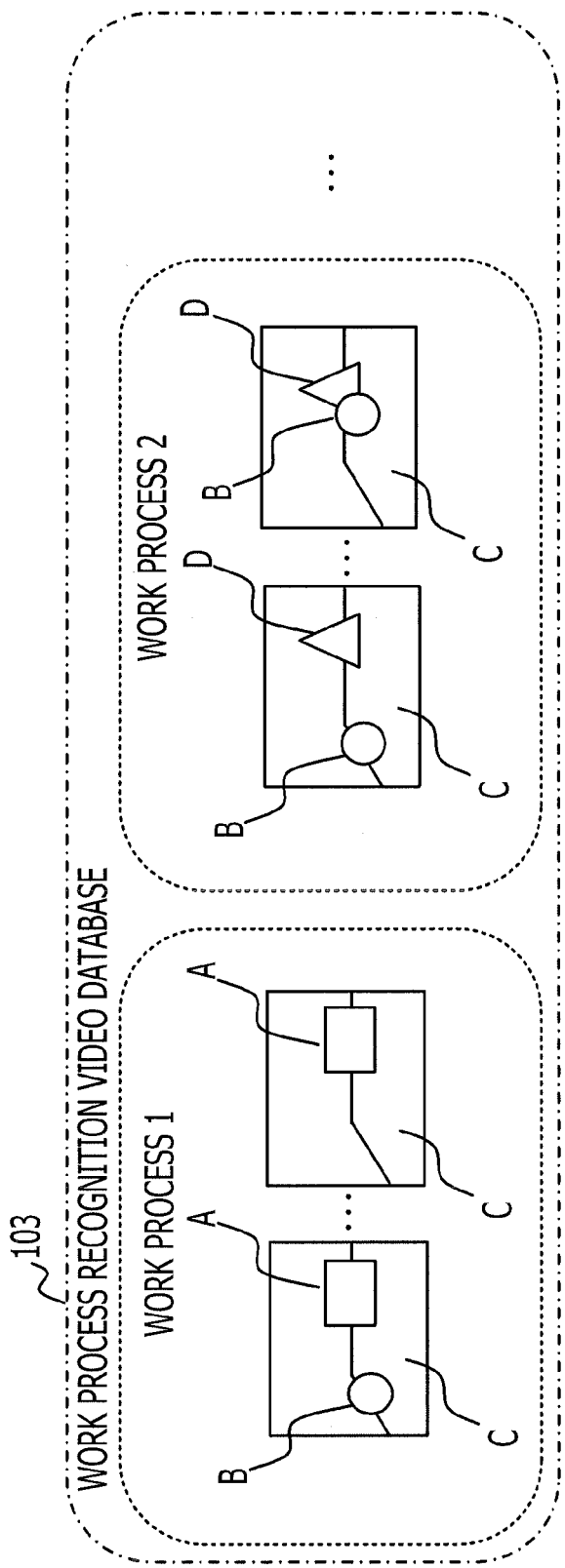

COMPUTER-READABLE STORAGE MEDIUM STORING IMAGE PROCESSING PROGRAM, IMAGE PROCESSING METHOD, AND IMAGE PROCESSING DEVICE

CROSS-REFERENCE TO RELATED APPLICATION

This application is based upon and claims the benefit of priority of the prior Japanese Patent Application No. 2011-49304, filed on Mar. 7, 2011, the entire contents of which are incorporated herein by reference.

FIELD

The embodiment discussed herein is related to a computer-readable storage medium storing image processing program that classifies a plurality of image information items, an image processing method and an image processing device.

BACKGROUND

For example, in order to search for a desired information item among collection of multimedia data items, such as images, an annotation technology in which meta data (e.g., an object name) is attached to the image of an object included in each of the multimedia data items has been developed.

For example, T. Malisiewicz and A. A. Efros, "Recognition by association via learning pre-exemplar distances," CVPR, 2008, discusses an annotation technology in which, using the result of recognition of the face images of a plurality of persons included in a still image, a tag indicating the name of a person is attached to each of the face images. The tag attached to each of the images of objects included in an image is determined on the basis of, for example, the similarity between the color or the shape of the object included in the image and the color or the shape prepared for each of the objects that the user wants to recognize.

In addition, Takayuki Baba and Tsuhan Chen (Cornell Univ.), "Object-Driven Image Group Annotation", Proceedings of 2010 IEEE 17th International Conference on Image Processing (ICIP2010), pp. 2641-2644, Sep. 26-29, 2010, discusses a technology in which the scene of a still image is recognized on the basis of, for example, information regarding a combination of objects included in the still image. In this technology, by using information regarding the objects included in a plurality of images pre-classified by the user and referring to information regarding a correspondence between object combination information prepared by a user and meta data indicating the type of a scene, the information regarding a combination of the objects that is the same as the object information is detected. Thereafter, the meta data indicating the type of the scene corresponding to the detected combination information is attached to each of the plurality of images.

Furthermore, Japanese Laid-open Patent Publication No. 2008-181515 discusses a technology in which among moving image data items, such as movies, for a moving image data item separated into parts of predetermined time spans by a user, a region including a partial image indicating a person or an object specified by a user is identified. Thereafter, meta data predetermined for the partial image is attached to the region including the partial image.

SUMMARY

In accordance with an aspect of the embodiments, a computer-readable storage medium storing an image processing program that causes a computer to execute a process includes acquiring the same object identification information included in a plurality of image data items by referring to a storage unit that stores each of the image data items, object identification information that identifies an object included in the image data item, and a location information item that identifies a location of the object in the image data item in association with one another; acquiring the location of the object identified by the acquired object identification information in each of the image data items by referring to the storage unit; computing a difference between the acquired location information items; comparing the difference between the location information items with a predetermined location threshold value; and determining whether the image data items are to be in the same group on the basis of a result of comparison of the difference between the location information items and the predetermined location threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 4A to 4E illustrate an example of data structure stored in a storage unit;

FIGS. 5A to 5F illustrate an example of location information;

FIGS. 9A and 9B illustrate an example of an object table and an example of decision table;

FIGS. 13A and 13B illustrate an example of a work process recognition model;

DESCRIPTION OF EMBODIMENT

Figure 1:
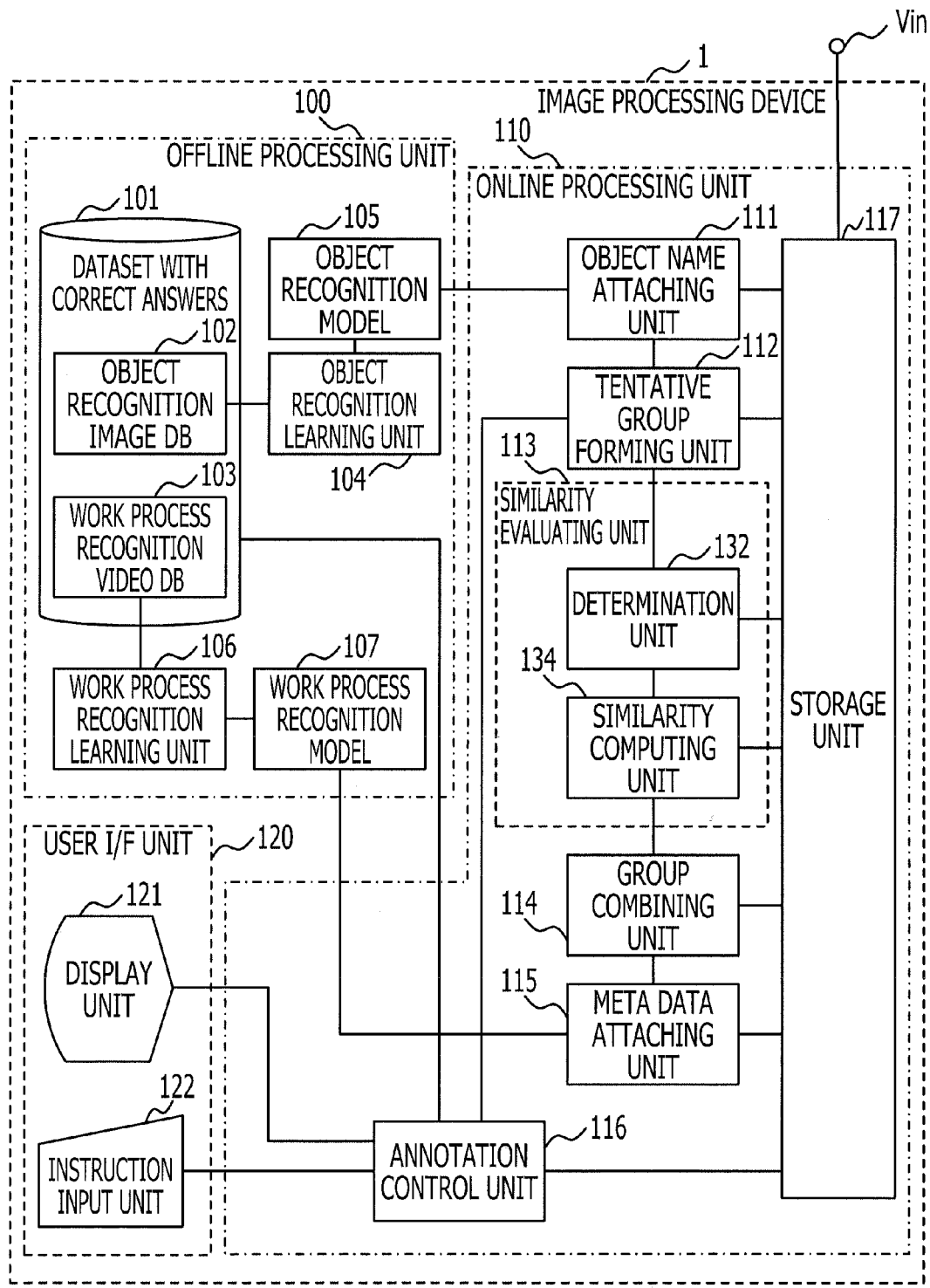
FIG. 1 illustrates the functional configuration of an image processing device according to an embodiment.

FIG. 1 illustrates the functional configuration of an image processing device 1 according to an exemplary embodiment. Note that upon receipt of video data obtained by capturing the scene of a manufacturing process of a product or parts, the image processing device 1 illustrated in FIG. 1 as an example automatically attaches meta data indicating a work process name to the video data. However, the input to the image processing device 1 is not limited to video data. A collection of any image information items that have a predetermined sequence may be input to the image processing device 1. As used herein, a correction of image information items having a predetermined sequence is referred to as an "image information sequence".

In the example illustrated in FIG. 1, the image processing device 1 includes an offline processing unit 100, an online processing unit 110, and a user interface (I/F) unit 120. The online processing unit 110 may receive, for example, video data input thereto via a video input terminal Vin.

The offline processing unit 100 includes a dataset 101 with a correct answer. The dataset 101 with a correct answer includes, for example, an object recognition image database (DB) 102 and a work process recognition video database (DB) 103. Before video data to be annotated is input, the offline processing unit 100 performs a learning process using the object recognition image database (DB) 102 and the work process recognition video database (DB) 103.

The object recognition image DB 102 stores a plurality of images obtained by capturing, for example, the images of a production site, such as a factory. The image of an object included in each of such captured images stored in the object recognition image DB 102 determinately has a name attached thereto, which indicates the object. The name of the object attached to the image of the object in the object recognition image DB 102 is an example of an object name.

In addition, the work process recognition video DB 103 stores video obtained by capturing the scene of a manufacturing process of a variety of products or parts in a production site. The video stored in the work process recognition video DB 103 determinately has a work process name attached thereto, which indicates the manufacturing process represented by the video. The work process name attached to each of the video items stored in the work process recognition video DB 103 is an example of meta data. Furthermore, at least part of the image included in each of the video item has an object name indicating the image of an object included in the image.

The offline processing unit 100 further includes an object recognition learning unit 104, an object recognition model 105, a work process recognition learning unit 106, and a work process recognition model 107. The object recognition learning unit 104 learns a correspondence relationship between an object name and the feature of the image of an object having the object name included in the image on the basis of the information stored in the above-described object recognition image DB 102. Thereafter, the offline processing unit 100 generates, on the basis of the result of learning, the object recognition model 105 for associating the feature of the image of the object included in the image with the object name identifying an object having the feature. In addition, the work process recognition learning unit 106 learns, on the basis of the information stored in the above-described work process recognition video DB 103, a correspondence relationship between a set of the names of the objects appearing in the video and the work process name. Thereafter, the work process recognition learning unit 106 generates, on the basis of the result of learning, the work process recognition model 107 for associating the set of the object names with the work process name identifying the operation related to the objects identified by the set of the object names.

As illustrated in FIG. 1, the online processing unit 110 includes an object name attaching unit 111, a tentative group forming unit 112, a similarity evaluating unit 113, a group combining unit 114, a meta data attaching unit 115, an annotation control unit 116, and a storage unit 117.

Video data obtained by capturing the scene of the manufacturing process of products or parts is input to the online processing unit 110 via the video input terminal Vin. The input video data is stored in the storage unit 117. Each of the object name attaching unit 111, the tentative group forming unit 112, the similarity evaluating unit 113, the group combining unit 114, the meta data attaching unit 115, and the annotation control unit 116 performs its processing by referring to the video data stored in the storage unit 117. In addition, the results of processing performed by the object name attaching unit 111, the tentative group forming unit 112, the similarity evaluating unit 113, the group combining unit 114, the meta data attaching unit 115, and the annotation control unit 116 are stored in the storage unit 117.

For example, the object name attaching unit 111 attaches an object name to an object image included in the image of each frame of the video data using the above-described object recognition model 105.

The tentative group forming unit 112 separates the video data into a plurality of tentative groups on the basis of the image capture time information attached to the video data. Note that the tentative group forming unit 112 may separate the video data into a plurality of tentative groups on the basis of information indicating the shooting direction of an image pickup apparatus and the image capture location at the image capture time in addition to the image capture time information. For example, if the image pickup apparatus includes a positioning device, such as a global positioning system (GPS), the position information provided by the positioning device is attached to the captured video data as the meta data indicating the image capture location. For example, if the video data includes different shooting directions of the image pickup apparatus or different image capture locations, the video data may include totally different scenes. Accordingly, the video data may be further separated as different video data.

The similarity evaluating unit 113 evaluates the similarity for every pair of two tentative groups that are temporally adjacent to each other within the video data (described in more detail below). If the similarity evaluating unit 113 evaluates that the adjacent tentative groups are similar, the group combining unit 114 combines the tentative groups.

For example, the group combining unit 114 may repeat the tentative group combining process until the similarity evaluating unit 113 evaluates that there is no pair of adjacent tentative groups that are similar.

The meta data attaching unit 115 attaches, using the above-described work process recognition model 107, a work process name to each of the final groups formed by combining the tentative groups through such a combining process. For example, using the work process recognition model 107, the meta data attaching unit 115 acquires the work process name indicating the work process corresponding to the set of object names recorded in a plurality of image information items belonging to each of the final groups.

The annotation control unit 116 may acquire the work process name attached to each of the final groups and the image information corresponding to the final group from the storage unit 117 and provide the work process name and the image information to the user via a display unit 121 of the user interface unit 120. In addition, the annotation control unit 116 receives an instruction input by the user via an instruction input unit 122 of the user interface unit 120. The annotation control unit 116 may use the instruction received from the user for the processes performed by the object name attaching unit 111, the similarity evaluating unit 113, and the group combining unit 114. For example, upon receipt of an instruction from the user, the annotation control unit 116 may update the data stored in the object recognition image DB 102 and the work process recognition video DB 103 on the basis of the data stored in the storage unit 117 of the online processing unit 110. In addition, the annotation control unit 116 may add the data stored in the storage unit 117 through the process performed by the online processing unit 110 to the object recognition image DB 102 and the work process recognition video DB 103. If the object recognition learning unit 104 and the work process recognition learning unit 106 construct the models using such modified and added data, the data may be applied to the following processing.

In the example illustrated in FIG. 1, the similarity evaluating unit 113 includes a determination unit 132 and a similarity computing unit 134.

The determination unit 132 refers to data stored in the storage unit 117 and determines whether each of the objects included in the image information included in the tentative group is a background object or a foreground object. For example, the determination unit 132 determines that an object included in an environment of an event represented by a plurality of image information items included in the tentative group is a background object. However, the determination unit 132 determines that an object changing in the environment of the event represented by a plurality of image information items included in the tentative group is a background object. Note that in this case, the background objects include the foreground objects. As used herein, the term "background object" refers to an object image that is included in at least a predetermined number of the image information items included in a tentative group and that has a difference between position information items in the image information items (i.e., the moving distance) smaller than or equal to a predetermined position threshold value used for determining the occurrence of movement. In addition, the term "foreground object" refers to an object image other than the background object. Note that the reason why the background object is defined as an object that is included in at least a predetermined number of the images in the tentative group rather than an object included in all of the images in the tentative group is that the case where the image of a background object is not captured in all of the images in the tentative group may occur due to the presence of a foreground object hiding the background object. Note that, in terms of a larger-smaller relationship regarding the "position threshold value", if the position threshold value is a maximum value of a difference for determining the occurrence of non-movement, the position threshold value is inclusive. However, if the position threshold value is a minimum value of a difference for determining the occurrence of movement, the position threshold value is not inclusive.

For example, the determination unit 132 may generate, for each of the tentative groups, an object table. The object table contains information including the determination result for an object in association with the object name indicating the object recorded in the image information included in the tentative group. The object table generated for each of the tentative groups may be stored in the storage unit 117.

The similarity computing unit 134 refers to the information stored in the storage unit 117 and computes the similarity between two background objects indicated by the object tables corresponding to two adjacent tentative groups. Thereafter, the similarity computing unit 134 sends, to the group combining unit 114, a message indicating whether the computed similarity is higher than a first predetermined threshold value as a similarity evaluation result.

Figure 2:
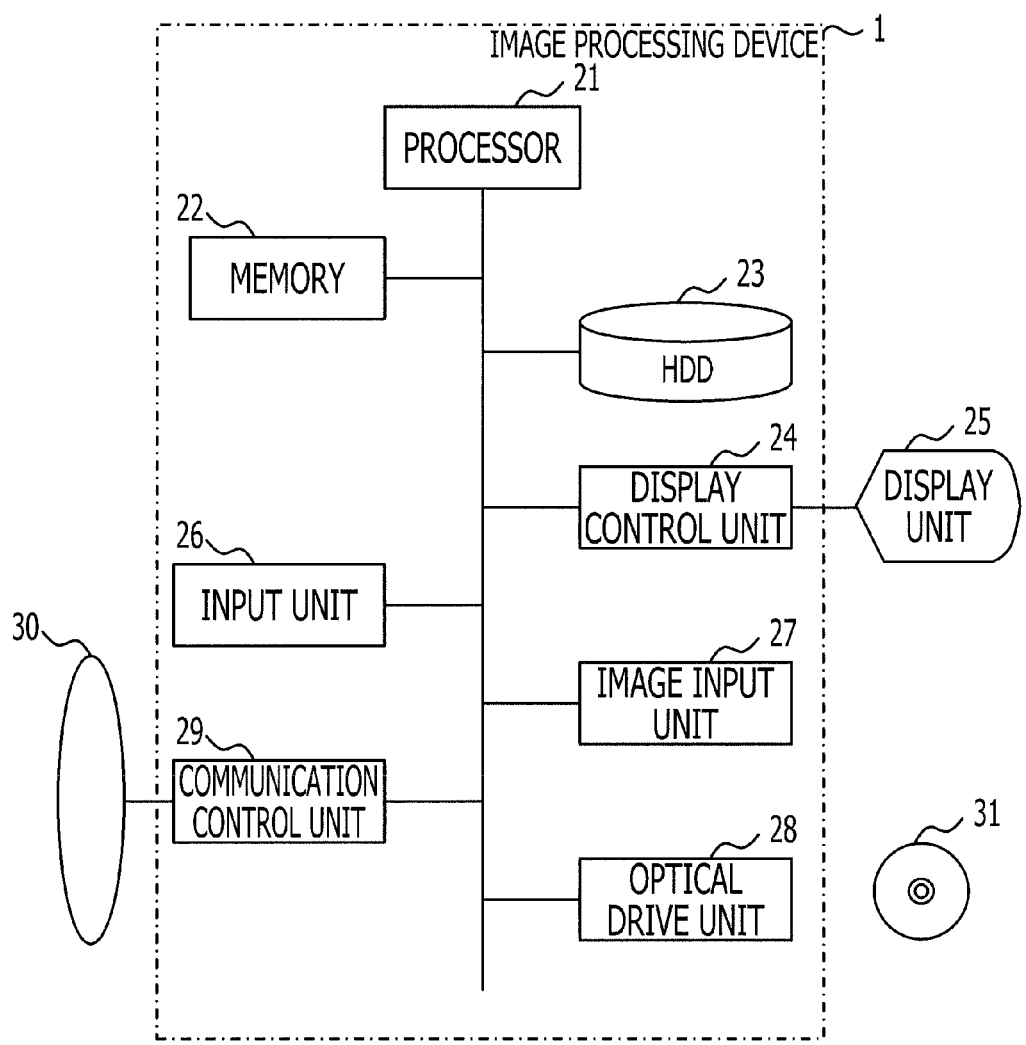
FIG. 2 illustrates the hardware configuration of the image processing device according to an embodiment.

FIG. 2 illustrates the hardware configuration of the image processing device 1 according to the present exemplary embodiment. As illustrated in FIG. 2, the image processing device 1 includes a processor 21, a memory 22, a hard disk drive (HDD) 23, a display control unit 24, a display unit 25, and an input unit 26. In addition, the image processing device 1 includes an optical drive unit 28 and a communication control unit 29.

The processor 21, the memory 22, the HDD 23, the display control unit 24, the input unit 26, the optical drive unit 28, and the communication control unit 29 are connected to one another via a bus. In addition, the communication control unit 29 is connected to a network 30. Furthermore, the image processing device 1 may include, for example, an image input unit 27, such as a video camera or a digital camera.

The HDD 23 stores an operating system and an application program for performing image processing including the above-described grouping process of the image information items and an annotation process. The application program includes sub-programs for performing processes included in the image processing method according to the present embodiment. Note that for example, the application program may be recorded in a computer-readable removable disk 31 and be distributed. By mounting the computer-readable removable disk 31 in the optical drive unit 28 and reading the application program, the application program may be installed in the HDD 23. Alternatively, the application program may be installed in the HDD 23 via the network 30 (e.g., the Internet), and the communication control unit 29.

As illustrated in FIG. 2, the image processing device 1 realizes the above-described variety of functions using the hardware, such as the processor 21 and the memory 22, that works harmoniously with the operating system and the application program.

FIGS. 3, 8, 10, 11, 12, and 13 illustrate the processing flow realized by the image processing device 1 executing an image processing program.

Figure 3:
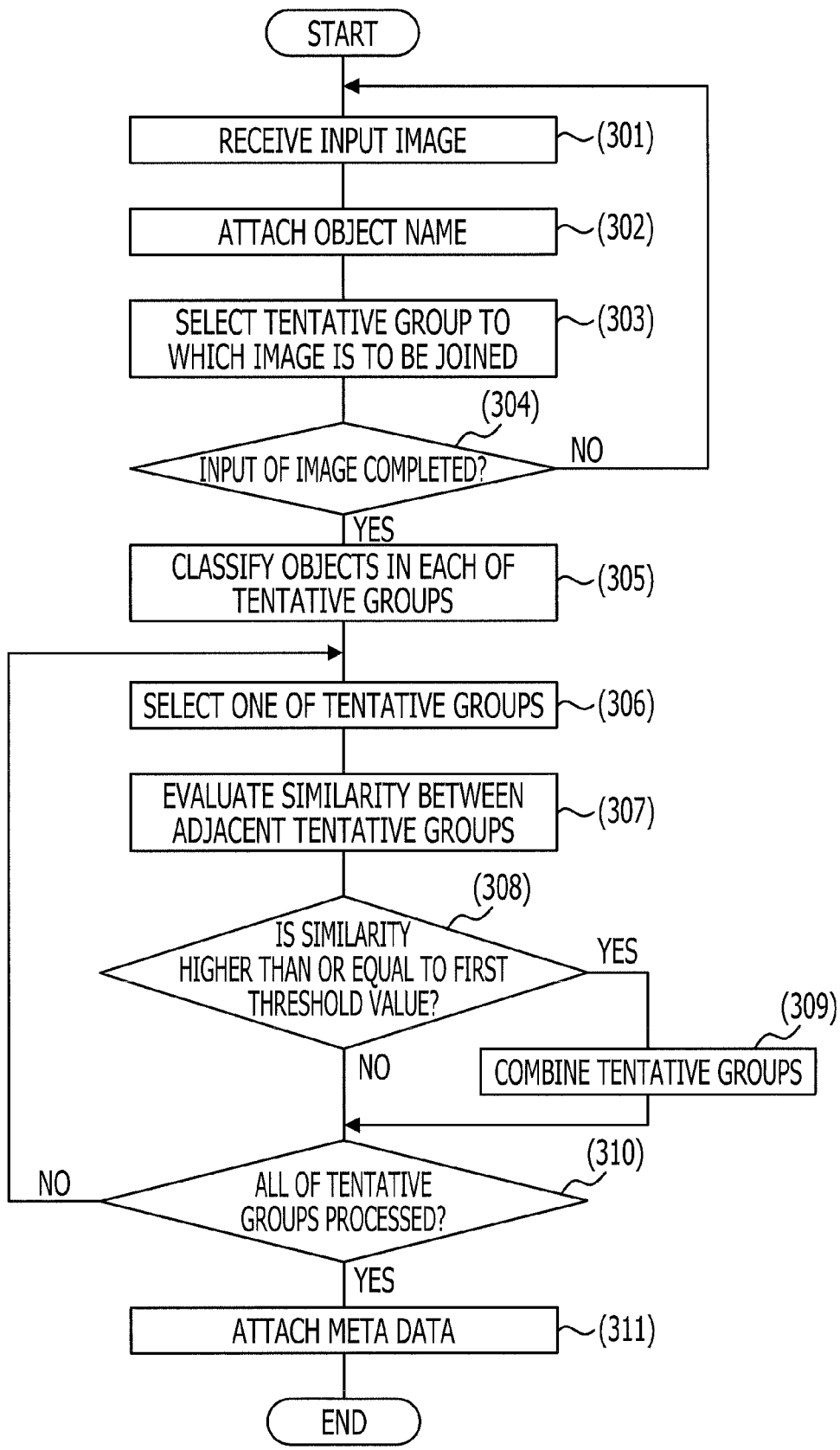
FIG. 3 is a flowchart of the image processing performed by the image processing device.

The function of the object name attaching unit 111 illustrated in FIG. 1 is realized by the image processing device 1 illustrated in FIG. 2 executing operations 301, 302, and 304 illustrated in FIG. 3. In addition, the function of the tentative group forming unit 112 illustrated in FIG. 1 is realized by the image processing device 1 executing operation 303 illustrated in FIG. 3. Furthermore, the function of the storage unit 117 illustrated in FIG. 1 is realized by the image processing device 1 storing, in the memory 22 or the HDD 23, the result of the process performed in operation 303. The function of the determination unit 132 illustrated in FIG. 1 is realized by the image processing device 1 executing the process in operation 305 illustrated in FIG. 3. Furthermore, an object table is stored in the storage unit 117 illustrated in FIG. 1 by the image processing device 1 storing, in the memory 22 or the HDD 23, the result of the process performed in operation 305. The function of the similarity computing unit 134 illustrated in FIG. 1 is realized by the image processing device 1 executing the processes in operations 306, 307, 308, and 310 illustrated in FIG. 3. The function of the group combining unit 114 illustrated in FIG. 1 is realized by the image processing device 1 executing the processes in operations 306 and 309 illustrated in FIG. 3. The function of the meta data attaching unit 115 illustrated in FIG. 1 is realized by the image processing device 1 executing the process in operation 311 illustrated in FIG. 3. Furthermore, the function of the annotation control unit 116 illustrated in FIG. 1 is realized by the image processing device 1 executing the processes in operations 357 to 359 illustrated in FIG. 12. Still furthermore, information generated in each of the units illustrated in FIG. 1 is stored in, for example, the memory 22 or the HDD 23.

According to the present exemplary embodiment, the information processing device may be realized by a computer reading a program for the procedures illustrated in FIG. 3 and executing the program. In addition, a service for receiving a plurality of image information items via a network, such as the Internet, and attaching meta data to each of the grouped image information items may be provided using a method including the procedures illustrated in FIG. 3.

FIG. 3 is a flowchart of the image processing performed by the image processing device 1. In addition, FIGS. 4A to 4E illustrate an example of data structure stored in the storage unit 117 after the image processing device 1 performs the process illustrated in FIG. 3.

Each time the image information regarding a frame included in the video data is input, the image processing device 1 performs a process for attaching a name of an object to each of the object images included in the input image information as an object name (operations 301 and 302).

During the processes performed in operations 301 and 302, for example, the image processing device 1 stores, in the storage unit 117, the image data of each of the frames included in the video data, object identification information for identifying an object included in the image data, and location information indicating the location of the object in the image data in association with the object.

FIG. 4A illustrates a video list indicating the video data items included in a collection of video data items stored in the storage unit 117. In the video list illustrated FIG. 4A, reference symbols "M1" and "M2" represent video identifiers (IDs) attached to video data M1 and M2, respectively. The image data of the frames included in the video data indicated by the reference symbols "M1" and "M2" are stored in the storage unit 117 so as to be referable using a frame ID assigned for each of the frames.

FIG. 4D illustrates an example of an object list indicating a set of the images of objects included in a frame 1. In FIG. 4D, reference symbols "T1" and "T2" represent object IDs attached to objects included in the frame 1, respectively.

FIGS. 4E-1 and 4E-2 illustrate examples of the object data of the objects T1 and T2 indicated by the objects IDs "T1" and "T2", respectively. Each of the object data items includes the name of the object given by the object name attaching unit 111 and the location information indicating the location of the image of the object in the image. Each of the object data items may further include feature information regarding the feature of the image of the object. Note that the object data items illustrated in FIGS. 4E-1 and 4E-2 are associated with the object IDs "T1" and "T2" illustrated in FIG. 4D using pointers, respectively.

FIGS. 5A to 5F illustrate the location information included in the object data. FIGS. 5A, 5C, and 5E each illustrates an example of the definition of the location information regarding an object. FIGS. 5B, 5D, and 5F illustrate examples of the formats of the location information corresponding to the definitions illustrated in FIGS. 5A, 5C, and 5E, respectively.

FIG. 5A illustrates an example in which the location of the image of an object is represented using central coordinates (Xc, Yc) indicating the central point of a rectangle that encloses the image of the object and distances dx and dy between the central point and each of the frames of the rectangle in the X and Y directions. FIG. 5B illustrates an example of the format of the location information corresponding to the definition illustrated in FIG. 5A.

FIG. 5C illustrates an example in which the location of the image of an object is represented using vertex coordinates (Xa, Ya) indicating a vertex of a rectangle that encloses the image of the object and a width W and a height H of the rectangle. Note that FIG. 5C illustrates an example in which the location of the image of an object is represented using the coordinates of a vertex at the upper left corner of the rectangle that encircles the image of the object. FIG. 5D illustrates an example of the format of the location information corresponding to the definition illustrated in FIG. 5C.

FIG. 5E illustrates an example in which the location of the image of an object is represented using the coordinates (X1, Y1), (X2, Y2), ... (Xn, Yn) of the vertexes of a polygon that encloses the image of the object. FIG. 5F illustrates an example of the format of the location information corresponding to the definition illustrated in FIG. 5E.

For each of the image information items of the frames subjected to the object name attaching process, the image processing device 1 performs a process for selecting a tentative group to which the frame is to be joined (operation 303). For example, the image processing device 1 compares the difference between the image capture time of the immediately previous frame and the image capture time of the current frame with a predetermined threshold value. If the difference in the image capture time is smaller than or equal to the predetermined threshold value, the image processing device 1 causes the current frame to join the tentative group including the immediately previous frame. However, if the difference in the image capture time is larger than the predetermined threshold value, the image processing device 1 causes the current frame to join a new tentative group that is different from the tentative group including the immediately previous frame. Note that if information indicating the image capture time is not included in the input video data, the image processing device 1, for example, separates the video data into data items each corresponding to the same predetermined period of time. In this way, a plurality of tentative groups may be generated. For example, the image processing device 1 separates the video data into data items each corresponding to 1 second, for example, separates the video data into data items each corresponding to several frames for 1 second. Thus, the image processing device 1 may generate a set of a plurality of tentative groups from the input video data.

Figure 6:
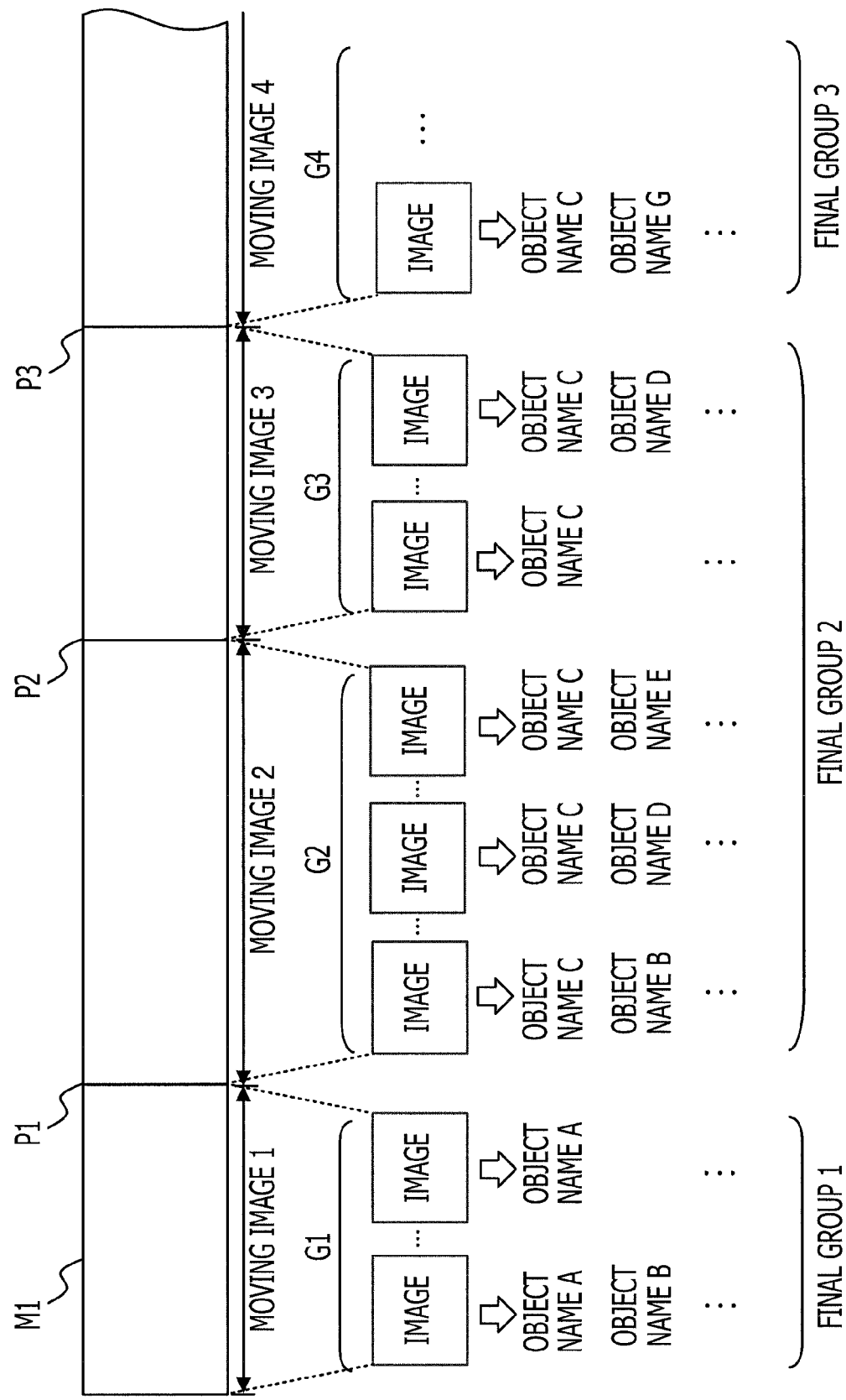
FIG. 6 illustrates a process for grouping the image information items included in video data.

FIG. 6 illustrates the process for grouping the image information items included in the video data.

As illustrated in FIG. 6, video data M1 is input in operation 301. The image capture time information regarding frames P1, P2, and P3 of the video data M1 is discontinuous. Note that in FIG. 6, a section of the video data from the start point to the frame P1 is defined as a moving image 1. A section of the video data from the frame P1 to the frame P2 is defined as a moving image 2. A section of the video data from the frame P2 to the frame P3 is defined as a moving image 3. Note that in FIG. 6, only part of a moving image 4 subsequent to the frame P3 is illustrated.

Upon receiving such video data, the image processing device 1 forms a tentative group for each of the ranges of the video data that maintains the continuity of the image capture time information. In FIG. 6, tentative groups G1 to G4 correspond to the moving images 1 to 4, respectively. In addition, in FIG. 6, as an example, the object names attached to the images of objects included in each of the images joined to each of the tentative groups G1 to G4 are illustrated.

The image processing device 1 stores, in the storage unit 117, the information indicating the tentative group formed by performing the process in operation 303 in association with the image information stored in the storage unit 117.

FIG. 4B illustrates an example of a tentative group list associated with the video data M1. As illustrated in FIG. 4B, the tentative group list includes a set of tentative group IDs for identifying the tentative groups including the tentative groups G1 to G4 included in the video data M1. Note that an arrow from the moving image ID "M1" illustrated in FIG. 4A to the tentative group list for the video data M1 illustrated in FIG. 4B represents a pointer link. In this way, the image processing device 1 stores the tentative group list associated with each of the video data items in the storage unit 117.

FIGS. 4C-1 and 4C-2 illustrate examples of a frame list indicating the image data items included in each of the tentative groups. FIG. 4C-1 illustrates an example of a frame list associated with the tentative group G1. The frame list illustrated in FIG. 4C-1 includes frame IDs "1" to "P1" indicating the image data items of frames 1 to P1, respectively. In addition, FIG. 4C-2 illustrates an example of a frame list associated with the tentative group G2. The frame list illustrated in FIG. 4C-2 includes frame IDs "P1+1" to "P2" indicating the image data items of frames P1+1 to P2, respectively. Similarly, the image processing device 1 generates frame lists for all the groups including the tentative groups G3 and G4 and stores the generated frame lists in the storage unit 117. Note that the arrows from the tentative group IDs "G1" and "G2" illustrated in FIG. 4B to the frame lists for the tentative groups G1 and G2 illustrated in FIGS. 4C-1 and 4C-2, respectively, represent pointer links.

After the above-described process in operation 303 is completed, the image processing device 1 determines whether input of the video data is completed (operation 304). If the subsequent video data is input ("NO" in operation 304), the processing performed by the image processing device 1 returns to operation 301, where the image processing device 1 performs the processing for new image information. In this way, the processes from operations 301 to 304 are repeated. Thus, the image processing device 1 performs a process for attaching an object name and a process for causing a frame to join a tentative group for each of the image information items included in the video data. Upon completion of the process for all of the image information items included in the video data ("YES" in operation 304), the processing performed by the image processing device 1 proceeds operation 305.

In operation 305, the image processing device 1 determines whether each of the objects included in the image information included in each of the tentative groups is a background object or a foreground object. In operation 306, the image processing device 1 selects one of the tentative groups. Thereafter, the image processing device 1 computes the similarity between the selected tentative group and a tentative group that neighbors the selected tentative group (operation 307).

Subsequently, the image processing device 1 compares the similarity computed in operation 307 with a first predetermined threshold value. If the similarity computed in operation 307 is higher than or equal to a first predetermined threshold value ("YES" in operation 308), the image processing device 1 combines the tentative group selected in operation 306 with the neighboring tentative group (operation 309). Note that the image processing device 1 may determine the first threshold value used in operation 308 on the basis of, for example, the similarity between the features of the images of the same object in two image data items.

Figures 7A, 7B, 7C:
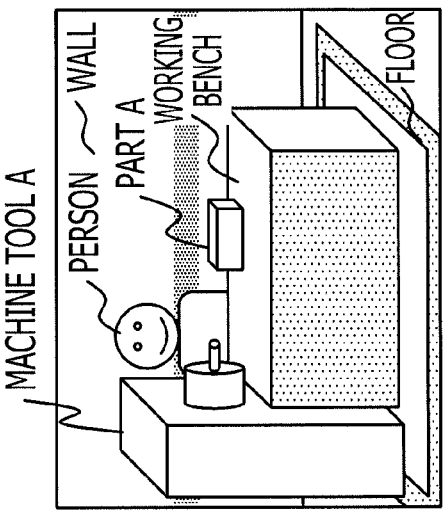
FIGS. 7A to 7E illustrate a process for combining tentative groups.

FIGS. 7A to 7E illustrate a combining process of the tentative groups. More specifically, FIGS. 7A to 7C illustrate an example of image information items included in three tentative groups that neighbors each other in the sequence arranged in the video data. Note that the object names attached to the object images included in each of the image information items illustrated in FIGS. 7A, 7B and 7C are linked to the corresponding object images using leader lines.

In FIG. 7A, each of the object images included in the image information has one of the object names "wall", "floor", "working bench", "person", and "part A". In the example illustrated in FIG. 7B, the same objects are illustrated. In addition, an object that has the object name "part B" different from the object illustrated in FIG. 7A is illustrated. In contrast, in the example in FIG. 7C, the object image having the object name "part B" is not illustrated, and an object that has the object name "machine tool A" is illustrated.

For example, the case where it is determined that, in a tentative group including the image information items illustrated in FIGS. 7A, 7B, and 7C, the object having the object names "wall", "floor", and "working bench" are background objects is discussed below. In such a case, the image processing device 1 evaluates the similarity between the tentative groups on the basis of the similarity between the object images having the object name "wall", the similarity between the object images having the object name "floor", and the similarity between the object images having the object name "working bench".

Figure 7D:
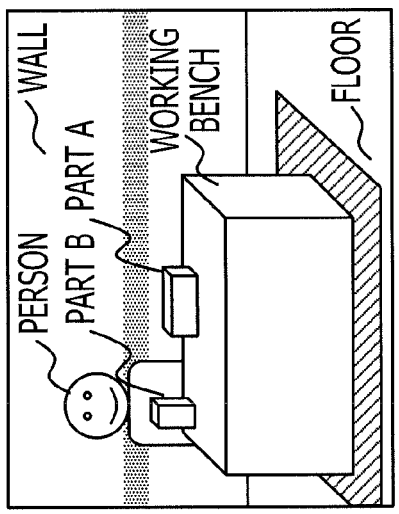

FIG. 7D illustrates an example of the result of evaluation of the similarity between the object images having the same object name included in each of the image information items illustrated in FIGS. 7A and 7B. In the example illustrated in FIGS. 7A and 7B, the features of the object images indicating each of a wall, a floor, and a working bench are similar to each other. In such a case, as illustrated in FIG. 4D, the image processing device 1 determines that the object images corresponding to the object names "wall", "floor", and "working bench" included in the two tentative groups have similarities higher than the first threshold value.

If, as described above, it is determined that the similarities for a plurality of background objects are high, it is highly likely that the image information items included in the two tentative groups were captured in the same environment. Accordingly, the image processing device 1 combines the neighboring tentative groups having high similarities in terms of background objects. In this way, the image processing device 1 may combine the tentative groups that are highly likely to be image-captured in the same environment.

Figure 7E:
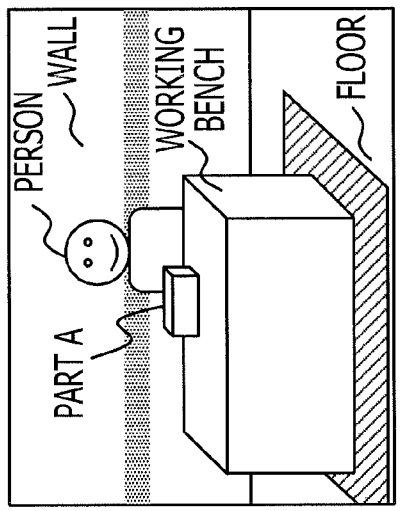

FIG. 7E illustrates an example of the result of evaluation of the similarity between the object images having the same object name included in each of the image information items illustrated in FIGS. 7B and 7C. In the example illustrated in FIGS. 7B and 7C, the features of the object images indicating a wall are similar to each other. However, the features of the object images indicating each of a floor and a working bench apparently differ from each other. In such a case, as illustrated in FIG. 4E, the image processing device 1 determines that the object images corresponding to the object names "floor" and "working bench" included in the two tentative groups have similarities lower than the first threshold value.

As described above, if it is determined that the similarities for a plurality of background objects are low, it is highly likely that the image information items included in the two tentative groups were captured in different environments. Accordingly, the image processing device 1 does not combine the neighboring tentative groups having such a result of evaluation. Thus, the tentative groups remain as independent groups.

In this way, the image processing device 1 may combine the tentative groups having, for example, significantly different image capture times if the similarities for the background objects are high.

The case in which in the example illustrated in FIG. 6, an object having the object name C included in all of the images in the tentative groups 2 and 3 is determined as the background object in the process performed on the tentative groups in operation 305 is described below. If the image processing device 1 determines that the similarity between the features of the object in the two tentative groups is high, the image processing device 1 combines the two tentative groups. In this way, the image processing device 1 may regard the moving images 2 and 3 that correspond to the two combined tentative groups 2 and 3, respectively, as the same range of the video data obtained by capturing, for example, the same work process, although the image capture times are discontinuous.

In contrast, the tentative groups 3 and 4 illustrated in FIG. 6 provide an example in which as a result of evaluation, it is determined that the similarity between the features of the object having the object name C in the two tentative groups is low. In such a case, the image processing device 1 does not combine the tentative groups. Accordingly, the tentative groups remain independent. In addition, the tentative group 1 corresponding to the moving image 1 and the above-described tentative group 2 does not include the same background object having the same object name. Even in such a case, the image processing device 1 does not combine the tentative groups. Therefore, the tentative groups remain independent.

As illustrated in FIG. 3, in operation 310, the image processing device 1 determines whether all of the tentative groups including a new tentative group generated through the combining process in operation 309 have been subjected to the process for determining whether the tentative group may be combined. If the determination made in operation 310 is "No", the processing returns to operation 306. Thereafter, the image processing device 1 performs the processes in operations 307 to 309 on one of the tentative groups that are not subjected to the process for determining whether the tentative group may be combined.

In this way, the image processing device 1 repeats the processes in operations 306 to 310. If the processes have been performed for all of the tentative groups ("Yes" in operation 310), the processing proceeds to operation 311.

By repeating the above-described tentative-group combining process, the image processing device 1 may combine the video data items having a similar image capture environment among the input video data items obtained by capturing the images of working processes even when the image capture times of the input video data items are discontinuous. Thus, through the process of combining tentative groups, the image processing device 1 may bring the border between the video data items closer to a point at which the feature of the environment of the captured image of a work process becomes discontinuous. Accordingly, the image processing device 1 may make the border between moving images corresponding to the tentative groups that remain independent when the positive determination is made in operation 310 the same as a point at which the features of the environment becomes discontinuous. Note that in such video data, a point at which the feature of the environment becomes discontinuous corresponds to the border of different working processes to be image-captured. Accordingly, each of the tentative groups is a group including the image information representing the flow of one of different working processes. Hereinafter, such a group is referred to as a "final group". In the example illustrated in FIG. 6, the tentative group 1 that corresponds to the moving image 1 still remains as a final group 1. In addition, the tentative groups 2 and 3 are combined into a final group 2. Furthermore, the tentative group 4 is included in a final group 3.

In a real manufacturing scene, when the image of a working flow of a desired work process is captured, the image capturing operation may be tentatively stopped during the working flow due to, for example, a break taken by the worker. Thereafter, when the work process restarts, the image capturing operation may restart. In such a case, the image capture time of the captured video data becomes discontinuous at the point in time at which the image capturing operation is stopped. By applying the tentative-group combining process performed by the image processing device 1 according to the embodiment of the present technology to such input video data, a tentative group corresponding to the moving image captured before the break may be combined with a tentative group corresponding to the moving image captured after the break. In this way, a final group corresponding to the moving image captured during the desired overall process flow may be formed.

The image processing device 1 attaches meta data indicating the work process name to each of the final groups formed in this manner (operation 311 illustrated in FIG. 3). At that time, for example, the image processing device 1 may acquire, from the storage unit 117, the set of object names corresponding to all of the objects recorded in the image information items included in each of the final groups. Thereafter, the image processing device 1 may identify the work process name adequate for the acquired set of object names using the work process recognition model 107.

For example, in the example illustrated in FIG. 6, the image processing device 1 performs a process for attaching meta data to the final group 2 using the object name C indicating a background object and a set of object names including the object names B, D, and E. In addition, in the example illustrated in FIG. 7, the image processing device 1 performs a process for attaching meta data to the final group corresponding to the range of the moving image including the images illustrated in FIGS. 7A and 7B in consideration of the foreground objects "person" and "part B" in addition to the background objects "wall", "floor", and "part A". That is, the image processing device 1 performs a process for attaching meta data to a final group in consideration of even a foreground object tentatively appearing in the range of a moving image corresponding to each of the final groups.

As described above, according to the present technology, the image processing device 1 may automatically group the video data items captured in a real manufacturing scene for each of the processes each representing collection of the work flows without using user-predefined object names used for grouping even when the image capture time is discontinuous. Since a work process name may be attached to each of the moving images obtained by capturing the images of the processes included in the video data through the automatic grouping process for the video data, an operation for appropriately grouping the moving images may be efficiently performed. Such a feature is significantly advantageous for generating an operation manual of each of increasing processes.

Note that the meta data attached to a grouped moving image is not limited to the above-described work process name. For example, any event recognizable using a set of object names indicating the objects recorded in the image information items included in a moving image may be used as meta data.

Note that a technique for identifying meta data indicating an event using a set of object names is described in, for example, Takayuki Baba and Tsuhan Chen (Cornell Univ.), "Object-Driven Image Group Annotation", Proceedings of 2010 IEEE 17th International Conference on Image Processing (ICIP2010), pp. 2641-2644, Sep. 26-29, 2010. In addition, a technique for recognizing an object included in an image information item is described in, for example, T. Malisiewicz and A. A. Efros, "Recognition by association via learning pre-exemplar distances", CVPR, 2008.

A process for determining whether an object is a background object or a foreground object for each of the tentative groups is described next.

Figure 8:
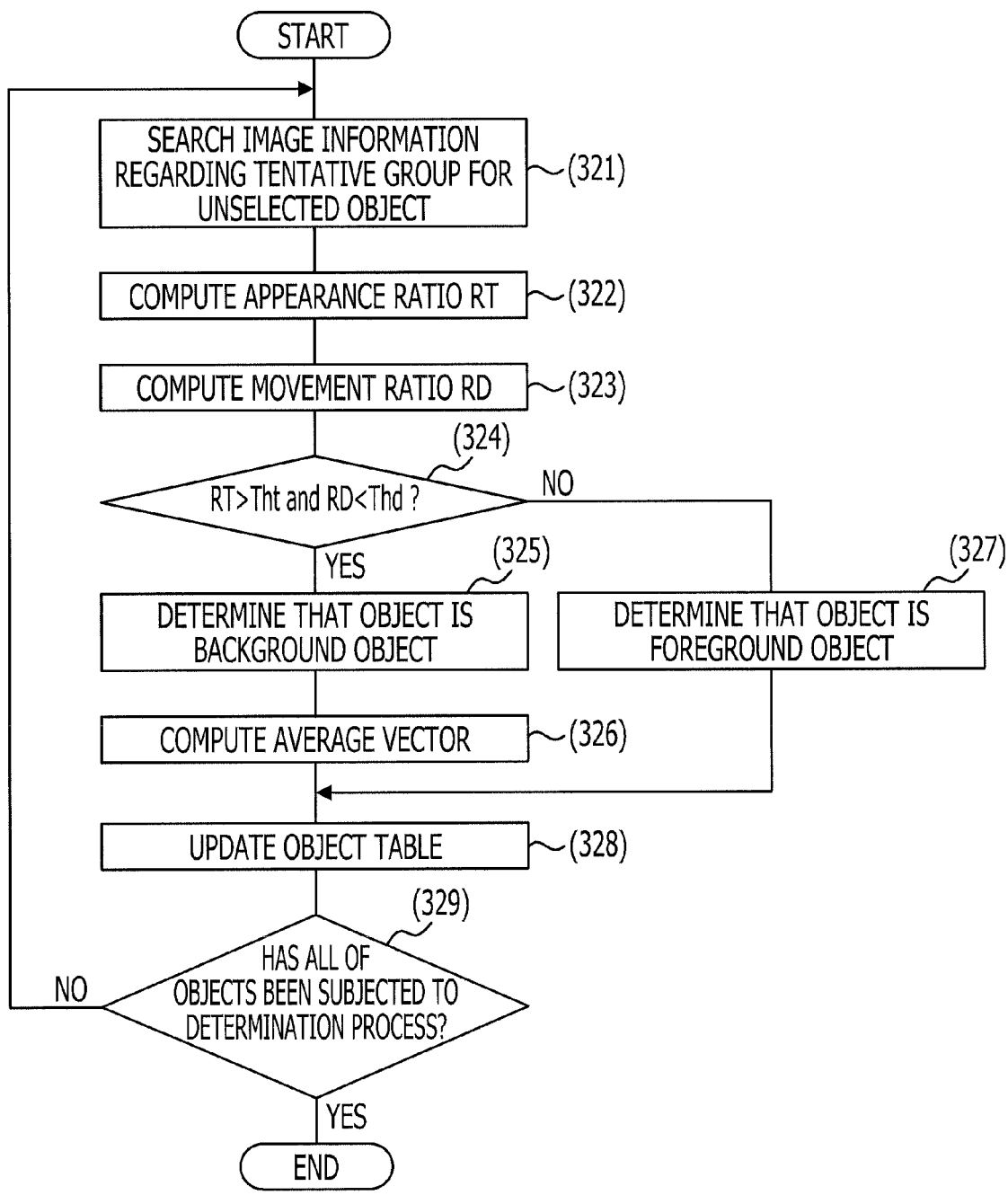
FIG. 8 is a flowchart of an object determination process.

FIG. 8 is a flowchart of an object determination process. Note that the procedure illustrated in FIG. 8 corresponds to operation 305 illustrated in FIG. 3.

In the example illustrated in FIG. 8, the image processing device 1 searches image information items included in a tentative group to be processed for one of unselected objects among the objects having the object names recorded in the image information items first (operation 321). Subsequently, the image processing device 1 computes an appearance ratio RT of the selected object and a movement ratio RD in the tentative group (operations 322 and 323). For example, the image processing device 1 may obtain the appearance ratio RT in the tentative group by dividing the number of image information items having the selected object recorded therein (np) by the total number of image information items included in the tentative group (N). In addition, the image processing device 1 computes the movement ratio RD in the tentative group using the object data stored in the storage unit 117 for each of the frames. For example, if, as illustrated in FIG. 5B, the object data includes the location information relative to the central position of the image of the object, the image processing device 1 obtains the movement ratio RD by dividing the number of occurrences of difference between a pair consisting of the central coordinates (Xc, Yc) and the distances (dx, dy) from the central coordinates of the selected object and a pair consisting of the central coordinates (Xc,Yc) and the distances (dx, dy) from the central coordinates of the object in the image information of the previous frame (nd) by the total number of image information items included in the tentative group (N). Alternatively, if, as illustrated in FIG. 5D, the object data includes the location information based on the vertex positions of a rectangle that encloses the image of the object, the image processing device 1, for example, obtains the movement ratio RD by dividing the number of occurrences of difference between a set of the coordinates (Xc,Yc) of the upper left vertex, the width W, and the height H of the selected object and a set of the coordinates (Xc, Yc) of the upper left vertex, the width W, and the height H of the object in the image information of the previous frame (nd) by the total number of image information items included in the tentative group (N). Still, alternatively, if, as illustrated in FIG. 5F, the object data includes the location information based on the vertex positions of a polygon that encloses the image of the object, the image processing device 1, for example, obtains the movement ratio RD by dividing the number of occurrences of difference between a set of the vertex coordinates (X1, Y1), (X2, Y2), . . . (Xn, Yn) of the polygon and a set of the vertex coordinates (X1, Y1), (X2, Y2), . . . (Xn, Yn) of the polygon in the image information of the previous frame (nd) by the total number of image information items included in the tentative group (N). Note that vibration of the image pickup apparatus (e.g., hand-shake of the image pickup apparatus occurring when a user takes a picture) makes the coordinates, the pairs, or the sets different even when the coordinates, the pairs, or the sets are completely the same. Accordingly, a certain threshold value that allows the hand-shake to be detected may be set, and it may be determined that the coordinates, the pairs, or the sets differ from each other if the difference is greater than or equal to the threshold value.

Subsequently, the image processing device 1 compares the appearance ratio RT and the movement ratio RD in the tentative group computed in this manner with a second threshold value Tht for the appearance ratio and a third threshold value Thd for the movement ratio, respectively (operation 324). When the appearance ratio RT is higher than the second threshold value Tht and if the movement ratio RD is lower than the third threshold value Thd ("Yes" in operation 324), the image processing device 1 determines that the object is a background object (operation 325). Thereafter, the image processing device 1 computes an average vector of the feature of the object in the tentative group on the basis of the feature of the object in each of the image information items included the tentative group (operation 326). For example, the image processing device 1 obtains a color histogram of part of the image corresponding to the object as the image feature of the image of the object that is determined to be a background object for each of the image information items included in the tentative group. Thereafter, the image processing device 1 averages the vectors representing the color histograms obtained from all of the image information items and, thus, obtains an average vector indicating an average feature of the object in the tentative group. Note that instead of the above-described color histogram, the image processing device 1 may use another image feature, such as a luminance histogram, as the image feature of the image of an object. Alternatively, when attaching the object name to each of the objects included in each of the image information items, the image processing device 1 may extract the feature of the object and obtain the above-described average vector on the basis of the features stored in the storage unit 117 in association with the image information items in the process for attaching the object name. By using such an average vector, the image processing device 1 may identify the images of objects that are determined to be the same object and that have different colors as different background objects. For example, when it is desirable that an image be determined to be an image of a different work process (a different situation or background) if the image of an object that is recognized as a background object has a different color, the image processing device 1 may recognize that the image indicates a different work process (a different situation or background) by using such an average vector and, therefore, the image processing device 1 may increase the accuracy of grouping.

However, if the appearance ratio RT or the movement ratio RD in the tentative group computed in operations 322 and 323 does not meet the above-described condition ("No" in operation 324), the image processing device 1 determines that the object is a foreground object (operation 327).

In operation 328, the image processing device 1 updates the object table stored in the storage unit 117 in association with the tentative group on the basis of the result of determination obtained in the above-described manner. If it is determined that the object to be determined is a background object, the image processing device 1, in operation 328, stores, in the object table in the storage unit 117, the result of determination, the average vector computed in operation 326, and the information regarding the location of the object in association with the object name. Alternatively, the image processing device 1 may compute the information indicating the location of the object to be stored in the object table on the basis of the location information included in the object data stored in the storage unit 117 in association with the image information item of each of the frames included in the tentative group. However, if it is determined that the object to be determined is a foreground object, the image processing device 1 stores, in the object table in the storage unit 117, information indicating that the object is a foreground object in association with the object name.

Subsequently, in operation 329, the image processing device 1 determines whether the determination has been made for all of the objects. If, in operation 329, the determination is "No", the processing of the image processing device 1 returns to operation 321, where the determination is made for a new object. In this way, the image processing device 1 repeats the processes from operations 321 to 329. If the determination has been made for all of the objects having the object names attached thereto ("Yes" in operation 329), the determination process is completed.

FIG. 9A illustrates an example of the object table obtained through the above-described determination process. In the example illustrated in FIG. 9A, the result of the above-described determination process performed by the image processing device 1 is illustrated. The determination process is performed on a series of image information items including objects having the object names "floor", "wall", "working bench", "person", and "part A" attached thereto.

The object table illustrated in FIG. 9A includes the result of determination in addition to the computed appearance ratio RT and the movement ratio RD in association with each of the object names. In addition, the object table illustrated in FIG. 9A includes the location information Pf, Pw, Pd, and Pp indicating the locations of the objects that are determined to be background objects and that have the object names "floor", "wall", "working bench", "person", and "part A" attached thereto, respectively. FIG. 9A further illustrates the average vectors Vf, Vw, Vd, and Vp of the image features of the corresponding objects. Note that in the object table illustrated in FIG. 9A, the objects determined to be background objects have a symbol "BACKGROUND" in a "foreground/background" field corresponding to the object name of the object. Similarly, the objects determined to be foreground objects have a symbol "FOREGROUND" in a "foreground/foreground" field corresponding to the object name of the object.

Note that in the determination process of an object, operation 322 for computing the appearance ratio RT, which is one of the indices of the determination, may be performed first, or operation 323 for computing the movement ratio RD, which is the other index of the determination, may be performed first. Alternatively, it may be determined whether each of the objects is a background object or a foreground object using another index in addition to both the appearance ratio RT and the movement ratio RD. Still alternatively, it may be determined whether each of the objects is a background object or a foreground object using another index in addition to one of the appearance ratio RT and the movement ratio RD.

Yet still alternatively, instead of using the indices computed for an object to be determined, such as the appearance ratio RT and the movement ratio RD, the determination process may be performed using a decision table indicating a predetermined determination result for each of the object names.

FIG. 9B illustrates an example of such a decision table. In the example illustrated in FIG. 9B, information indicating whether an object having each of the object names is the background object or the foreground object is stored in the foreground/background field.

For example, such a decision table may be prepared on the basis of the video data obtained by capturing the scenes of various processes stored in the work process recognition video DB 103 included in the dataset 101 with correct answers illustrated in FIG. 1. The image information items included in such video data have a variety of objects recorded therein. For each of the objects, determination may be made whether the object is a background object which serves as part of the environment in the work process indicated by the video data or a foreground object which varies with the progress of the work process. Such determination may be made together with the process for attaching an object name and a work process name when, for example, the video data is stored in the work process recognition video DB 103.

The process for evaluating the similarity between two neighboring tentative groups is described next. The similarity between two neighboring tentative groups may be computed using, for example, the average vector of a background object included in the object tables generated for the tentative groups as follows.

Figure 10:
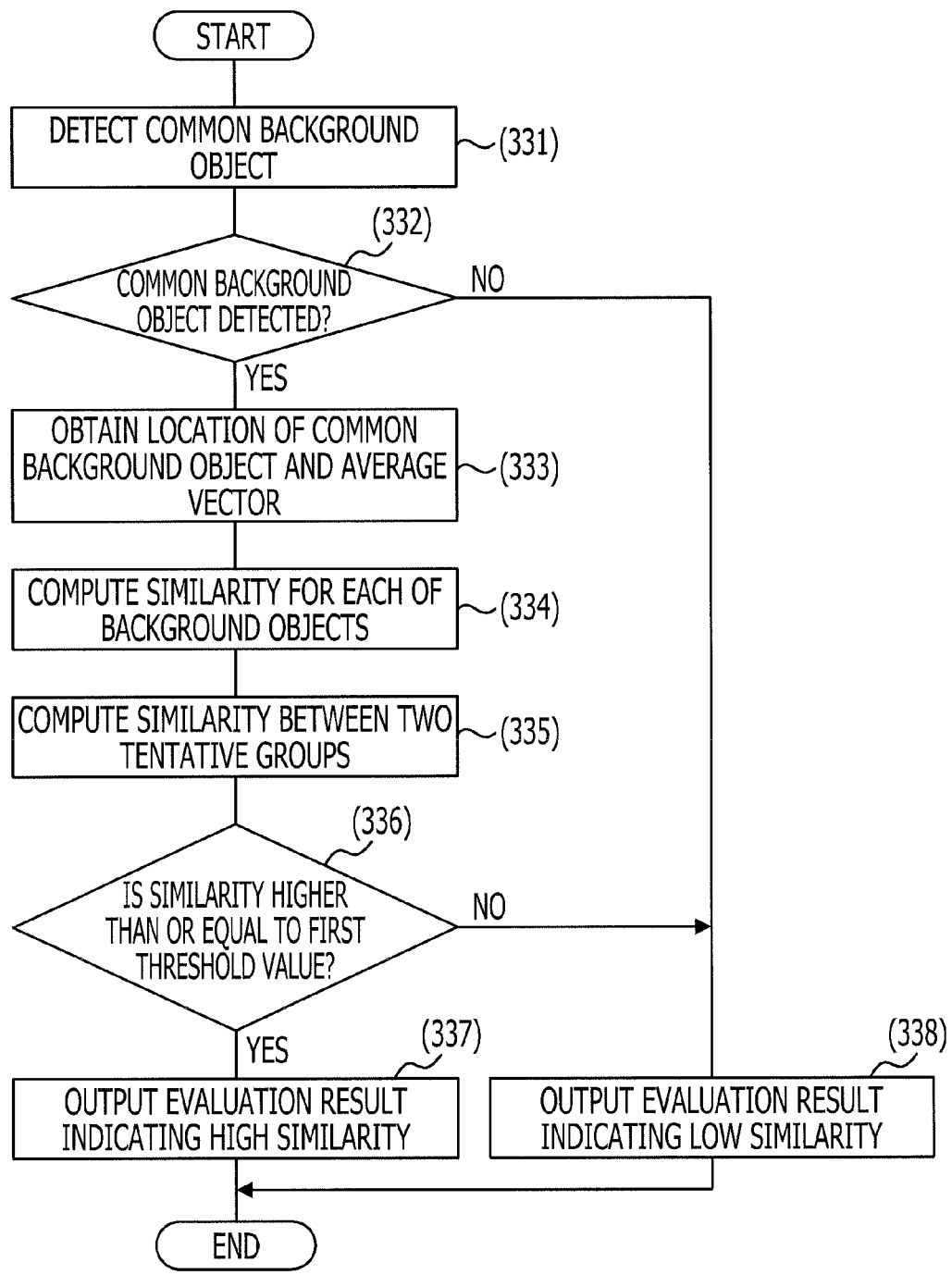
FIG. 10 is a flowchart of the process for evaluating similarity.

FIG. 10 is a flowchart of the process for evaluating the similarity. The procedure illustrated in FIG. 10 is an example of the process corresponding to operations 307 and 308 illustrated in FIG. 3.

The image processing device 1 detects a background object that is common in two neighboring tentative groups by comparing two object tables stored in the storage unit 117 in association with the two neighboring tentative groups (operation 331). If, in operation 331, the image processing device 1 detects at least one common background object ("Yes" in operation 332), the processing proceeds to operation 333.

In operation 333, the image processing device 1 acquires, from each of the two object tables stored in the storage unit 117, the location information and the average vector of the common object detected in operation 331. Thereafter, the image processing device 1 computes the similarity for each of the common background objects using the location information and the average vectors acquired from the object tables (operation 334). The image processing device 1 computes the similarity between the locations of the two background objects so that, for example, as the distance between the locations indicated by the location information regarding the two tentative groups decreases, the value of the similarity increases. Similarly, the image processing device 1 computes the similarity between the image features of the two background objects so that, for example, the distance between the features indicated by the average vectors obtained for the two tentative groups decreases, the value of the similarity increases. Subsequently, the image processing device 1 computes the similarity between the two tentative groups on the basis of the similarity of each of the common background objects (operation 335). For example, the image processing device 1 may compute, as the similarity between the two tentative groups, the sum of the values of the similarity regarding the locations of the background objects and the values of similarity regarding the image features of the background objects.

The image processing device 1 compares the similarity between the two tentative groups computed in this manner with a first predetermined threshold value (operation 336). If the similarity between the two tentative groups is higher than or equal to the first threshold value ("Yes" in operation 336), the image processing device 1 outputs the evaluation result indicating that the similarity between the two tentative groups is high (operation 337). However, if the determination made in operation 332 or 336 is "No", the image processing device 1 outputs the evaluation result indicating that the similarity between the two tentative groups is low (operation 338).

Note that the image processing device 1 may perform the processes from operations 333 to 338 in terms of the location information regarding the objects.

When combining two neighboring tentative groups having high similarity as a result of the above-described process for evaluating the similarity, the image processing device 1 may combine the object tables corresponding to the two tentative groups.

Figure 11:
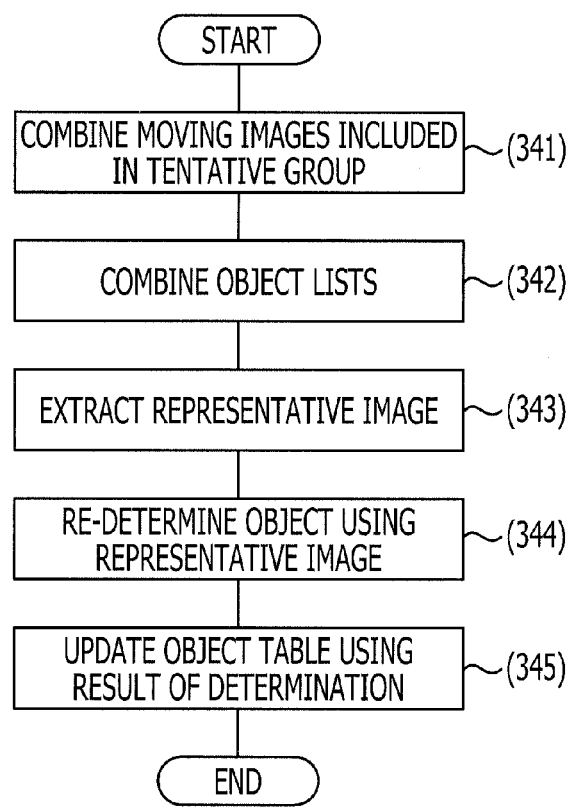
FIG. 11 is a flowchart of the process for combining tentative groups.

FIG. 11 is a flowchart of the process for combining tentative groups. The procedure illustrated in FIG. 11 represents an example of the process corresponding to operation 309 illustrated in FIG. 3.

The image processing device 1 combines the moving images corresponding to two tentative groups to be combined first (operation 341). Through the combining process, a new tentative group including image information items included in the two tentative groups is formed.

Subsequently, the image processing device 1 combines the object tables corresponding to the two tentative groups that are combined (operation 342). In this way, an object table including, for example, the information regarding the object included in at least one of the two tentative groups is generated.

Subsequently, the image processing device 1 extracts a plurality of representative images from the image information included in the tentative group newly formed through the combining process (operation 343). For example, the image processing device 1 extracts image information evenly distributed in the new tentative group as the representative image. For example, the image processing device 1 may extract one representative image for each of a plurality of frames corresponding to a predetermined period of time.

Thereafter, the image processing device 1 determines whether each of the objects indicated by the object table combined in operation 342 is a background object or a foreground object on the basis of the extracted representative images (operation 344). At that time, in order to compute the appearance ratio and the movement ratio of each of the objects, the image processing device 1 computes, for example, the appearance ratio and the movement ratio in the set of the tentative images. Subsequently, the image processing device 1 determines whether each of the objects is a background object or a foreground object by determining whether the appearance ratio and the movement ratio of the object meet the conditions illustrated in operation 324 of FIG. 8. Note that the image processing device 1 performs a process that is the same as the process in operation 326 of FIG. 8 on the object that is determined to be a background object for the set of the representative images. Thus, through such a process, the image processing device 1 computes the average vector indicating the average value of the features of the objects in the tentative group.

In operation 345, the image processing device 1 updates, using the result of determination obtained in this manner, the object table stored in the storage unit 117 in association with the tentative group newly formed. Thereafter, the image processing device 1 uses the object table in the process for evaluating the similarity between the tentative group formed through the combining process and a tentative group that neighbors the tentative group.

Thus, final groups are formed through the above-described tentative-group combining process. The process for attaching, to each of the final groups, meta data indicating an event represented by the moving image included in the final group is described next.

Figures 12, 12B:
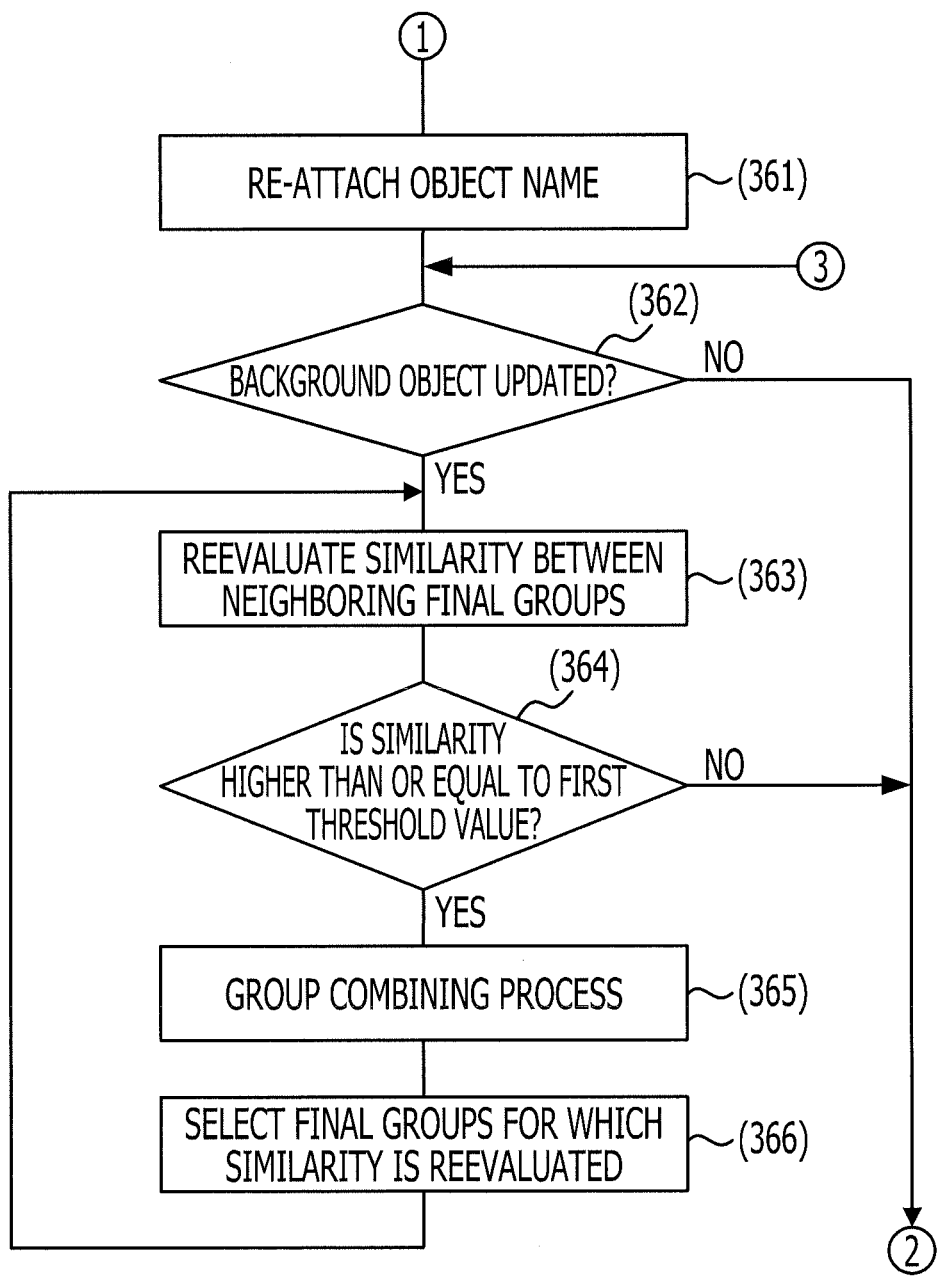
FIG. 12 is a flowchart of a process for attaching meta data.

FIGS. 12 and 13 illustrate a flowchart of the meta data attaching process. Note that the flowcharts illustrated in FIGS. 12 and 13 are connected at the terminals indicated by the same number. Note that the procedures illustrated in FIGS. 12 and 13 correspond to operation 311 illustrated in FIG. 3.

The image processing device 1 sequentially selects one of the final groups to be subjected to a meta data attaching process from among the unprocessed final groups and acquires the object table stored in the storage unit 117 for the selected final group (operation 351).

Subsequently, the image processing device 1 identifies, using the work process recognition model 107 (refer to FIG. 1), a work process that matches the set including all of the object names included in the object table (operation 352).

FIGS. 13A and 13B illustrate the work process recognition model 107. More specifically, FIG. 14A illustrates an example of the work process recognition video DB 103 included in the dataset 101 with correct answers illustrated in FIG. 1. In addition, FIG. 14B illustrates an example of a work process recognition table extracted from the video data included in the work process recognition video DB 103 illustrated in FIG. 14A.

The work process recognition video DB 103 illustrated in FIG. 14A includes a plurality of the video data items. Each of the video data items has meta data indicating a work process name. In addition, each of the image information items included in each of the video data items has an object name attached thereto. The object name indicates an object included in the image information item.

Accordingly, for each of the video data items, the image processing device 1 may acquire the set of object names corresponding to the work process name by collecting the object names attached to the image information items included in the video data item. Thereafter, the image processing device 1 performs a determination process that is similar to the above-described determination process from operations 321 to 329 on each of the objects indicated by the object names included in the set of object names.

The image processing device 1 may represent the result of the determination process in the form of a work process recognition table. For example, the work process recognition table includes information indicating whether each of all of the objects is included in each of the processes as a background object or a foreground object or is not included in each of the processes. Note that in the work process recognition table illustrated in FIG. 14B, in a cell indicated by a work process that includes an object serving as a background object and the object name of the object, a reference symbol "BACKGROUND" is set. Similarly, in a cell indicated by a work process that includes an object serving as a foreground object and the object name of the object, a reference symbol "FOREGROUND" is set. In addition, in a cell indicated by a work process corresponding to the video data item that does not include any image information item having an object and the object name of the object, a reference symbol "-" is set.

In the work process recognition model 107 of the image processing device 1, for example, the degree of coincidence between the set of object names indicated by the object table corresponding to the final group to which meta data is to be attached and the set of object names corresponding to each of the work process names is evaluated. The image processing device 1 may evaluate the degree of coincidence in consideration of the coincidence/incoincidence between the grouping result as to whether each of the object names corresponds to a background or a foreground. In operation 352 illustrated in FIG. 12, by using the result of evaluation, the image processing device 1 identifies the work process name corresponding to the set of object names that has the highest degree of coincidence with the set of object names corresponding to the final group to which meta data is to be attached.

Note that in operation 352, the image processing device 1 may evaluate the degree of coincidence between the set of object names indicated by the object table and the set of object names corresponding to each of the work process names by using a background object.

Subsequently, the image processing device 1 attaches the work process name identified in operation 352 to the final group as meta data that indicates the moving image included in the final group to which meta data is to be attached (operation 353). Thereafter, the image processing device 1 determines whether the meta data attaching process has been performed on all of the final groups (operation 354).

If the final group that has not meta data attached thereto is found ("No" in operation 354), the processing performed by the image processing device 1 returns to operation 351. Thereafter, the image processing device 1 starts the meta data attaching process for the next final group. By repeating the above-described processes in operations 351 to 354, the image processing device 1 may complete the meta data attaching process for all of the final groups.

In the example illustrated in FIGS. 12 and 13, after the process for attaching meta data to all of the final groups has been completed ("Yes" in operation 354), the image processing device 1 verifies the result of the process for attaching meta data through operation 355 and the subsequent operations.

In operation 355, the image processing device 1 performs a process for verifying the consistency between the set of object names corresponding to the meta data attached in the above-described work process and the set of object names corresponding to each of the final groups. For example, the image processing device 1 searches the set of object names corresponding to the final group to be verified and detects an object name that is not included in the set of object names corresponding to the work process name attached to the final group. Such an object name is inconsistent data. For example, the image processing device 1 may detect inconsistent data using the set of object names defined for a work process name in the above-described work process recognition table.

If, in operation 355, such inconsistent data is not detected ("No" in operation 356), the processing performed by the image processing device 1 proceeds to operation 357.

In operation 357, the image processing device 1 displays the result of the meta data attaching process. For example, the image processing device 1 instructs the display unit 121 illustrated in FIG. 1 to display the video representing the image information items included in each of the final groups together with text information indicating the meta data attached to the final group. In addition, the image processing device 1 may instruct the display unit 121 to display the object name attached to each of the objects included in each of the image information items in the final group together with the video corresponding to the final group. By displaying, on the display unit 121, the video corresponding to each of the final groups and an annotation result including the meta data that is hierarchically attached to the video through the image processing technology according to the present embodiment in the above-described manner, a user may verify the video. The annotation result includes the meta data attached to a final group formed by combining a series of image information items and the meta data attached to an object recorded in each of the image information items combined into the final group.

While the result of the meta data attaching process is being displayed in the above-described manner, the image processing device 1 may receive, from the user through an instruction input unit 123 of the user interface unit 120, an input instructing updating of the result of the meta data attaching process.

If the image processing device 1 has not received an update instruction from the user ("No" in operation 358), the image processing device 1 determines that the meta data attached through the image processing technology according to the present embodiment is verified by the user. In such a case, the image processing device 1 completes the meta data attaching process and the meta data verification process for the input video data.

However, if the image processing device 1 receives an update instruction from the user ("Yes" in operation 358), the image processing device 1 may update the annotation result on the basis of the update instruction received in operation 359. For example, in operation 359, the image processing device 1 may update the work process name attached to the specified final group or the object name attached to the specified object.

If, in operation 359, only the work process name attached to any one of the final groups is updated and the object name is not updated ("No" in operation 360), the processing performed by the image processing device 1 returns to operation 357. Thereafter, the image processing device 1 instructs the display unit 121 to display the updated annotation result. In this way, the user may view the updated annotation result.

However, if the determination made in operation 360 is "Yes" or inconsistency is detected in operation 355 ("Yes" in operation 356), the image processing device 1 may perform the annotation update process again (described in more detail below).

If the determination in operation 356 is "Yes", the processing performed by the image processing device 1 proceeds to operation 361 by following a connection relationship indicated by the terminals having a number of "1" illustrated in FIGS. 12 and 13. In operation 361, the image processing device 1 re-attaches an object name to the object having an object name detected as inconsistent data. For example, the image processing device 1 may perform the object name re-attaching process on only the set of object names corresponding to the work process name attached to the final group in operation 353. For example, the image processing device 1 selects, as candidates for the object name re-attaching process, the object names indicated in the work process recognition table as a background object or a foreground object in association with the work process name attached to the final group. Under such limitation, the image processing device 1 may update an object name detected as inconsistent data so that the object name is optimal for the work process name attached to the final group. After the process in operation 361 is completed, the processing performed by the image processing device 1 proceeds to operation 362.

However, if the image processing device 1 has updated an object name in response to an instruction received from the user ("Yes" in operation 360), the processing performed by the image processing device 1 proceeds to operation 362 by following a connection relationship indicated by the terminals having the number "3" illustrated in FIGS. 12 and 13.

In operation 362, the image processing device 1 determines whether the object having the object name to be updated is a background object. If the object having the object name to be updated is a foreground object ("No" in operation 362), the image processing device 1 maintains the range of the moving image corresponding to the final group including the object. If the determination made in operation 362 is "No", the processing performed by the image processing device 1 returns to operation 351 by following a connection relationship indicated by the terminals having the number "2" illustrated in FIGS. 12 and 13. Thereafter, the image processing device 1 attaches meta data indicating the work process name to the final group corresponding to the object on the basis of the updated object table.

However, if the object having the object name to be updated is a background object ("Yes" in operation 362), the processing performed by the image processing device 1 proceeds to operation 363. This is because the range of the final group may be changed in accordance with this update. In operation 363, the image processing device 1 re-evaluates the similarity between the final group including a background object having the updated object name and a final group that neighbors the final group. For example, the image processing device 1 may re-evaluate the similarity in operation 363 by performing the processes in operations 331 to 338 illustrated in FIG. 10 on the final group to be re-evaluated.

Subsequently, the image processing device 1 determines whether the similarity obtained through the re-evaluation process is higher than or equal to the first threshold value (operation 364). If the determination made in operation 364 is "Yes", the image processing device 1 performs a process for combining the final groups, as in operations 341 to 345 illustrated in FIG. 11 (operation 365). Thereafter, in operation 366, the image processing device 1 selects the final group formed through the combining process performed in operation 365 and a final group that neighbors the final group as groups for which the similarity is reevaluated. Subsequently, the processing performed by the image processing device 1 returns to operation 363.

The image processing device 1 repeats the processes from operations 363 to 366 illustrated in FIG. 12 until the similarity between the final groups to be re-evaluated becomes lower than the first threshold value in operation 364. In this way, the image processing device 1 may detect all of the final groups that are possibly combined as a result of updating of the object name of the above-described background object and combine the final groups.

If the similarity between the final groups to be re-evaluated becomes lower than the first threshold value ("No" in operation 364), the processing performed by the image processing device 1 returns to operation 351 by following a connection relationship indicated by the terminals having the number "2" illustrated in FIGS. 12 and 13. Thereafter, the image processing device 1 attaches meta data indicating the work process name to the new final group formed through the above-described combining process.

The image processing technology according to the present embodiment is applicable to, for example, an image information sequence including a sequence of a plurality of still images in addition to video data.

Figure 14:
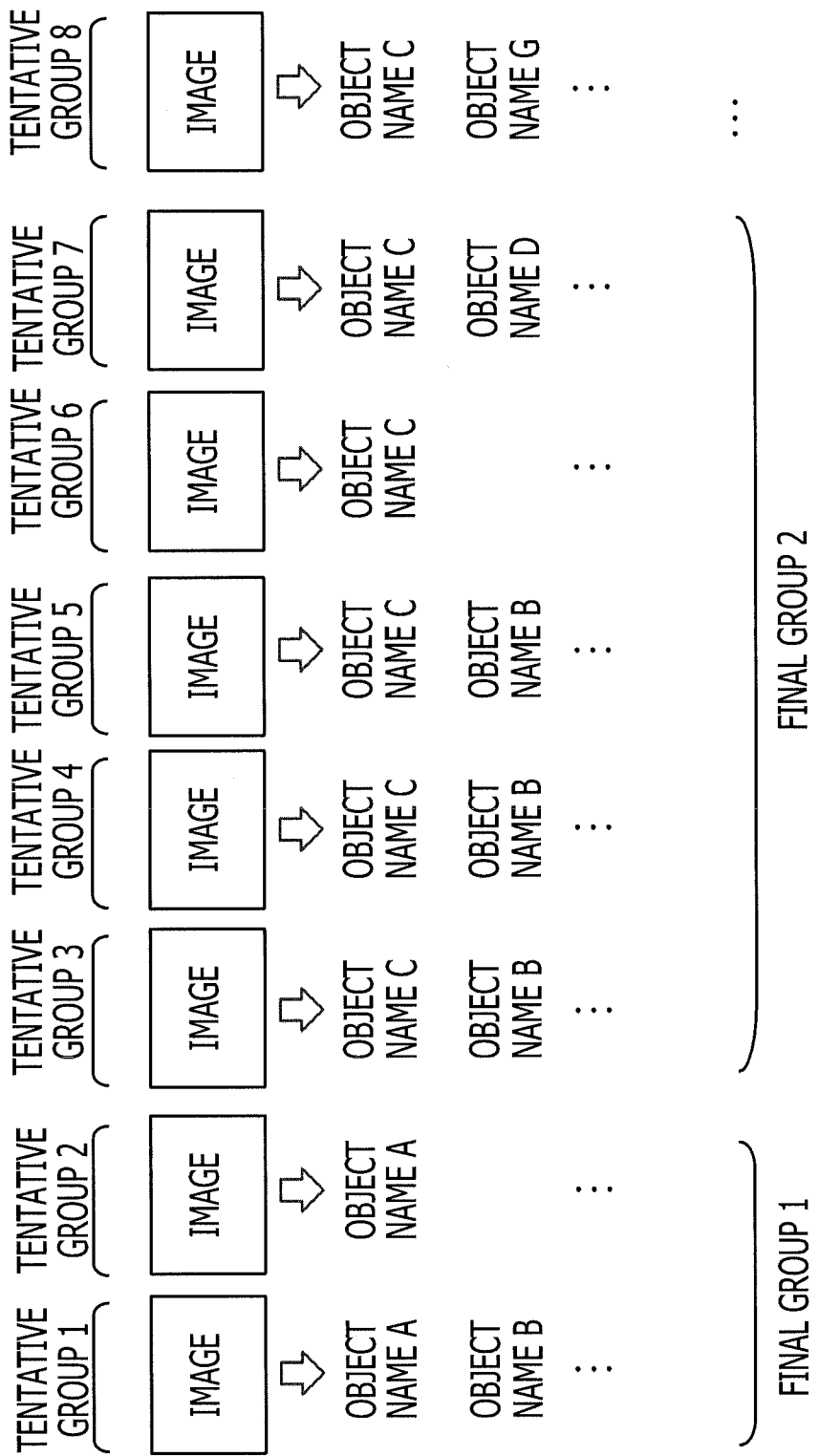
FIG. 14 illustrates a grouping process for an image information sequence.
Figure 15:
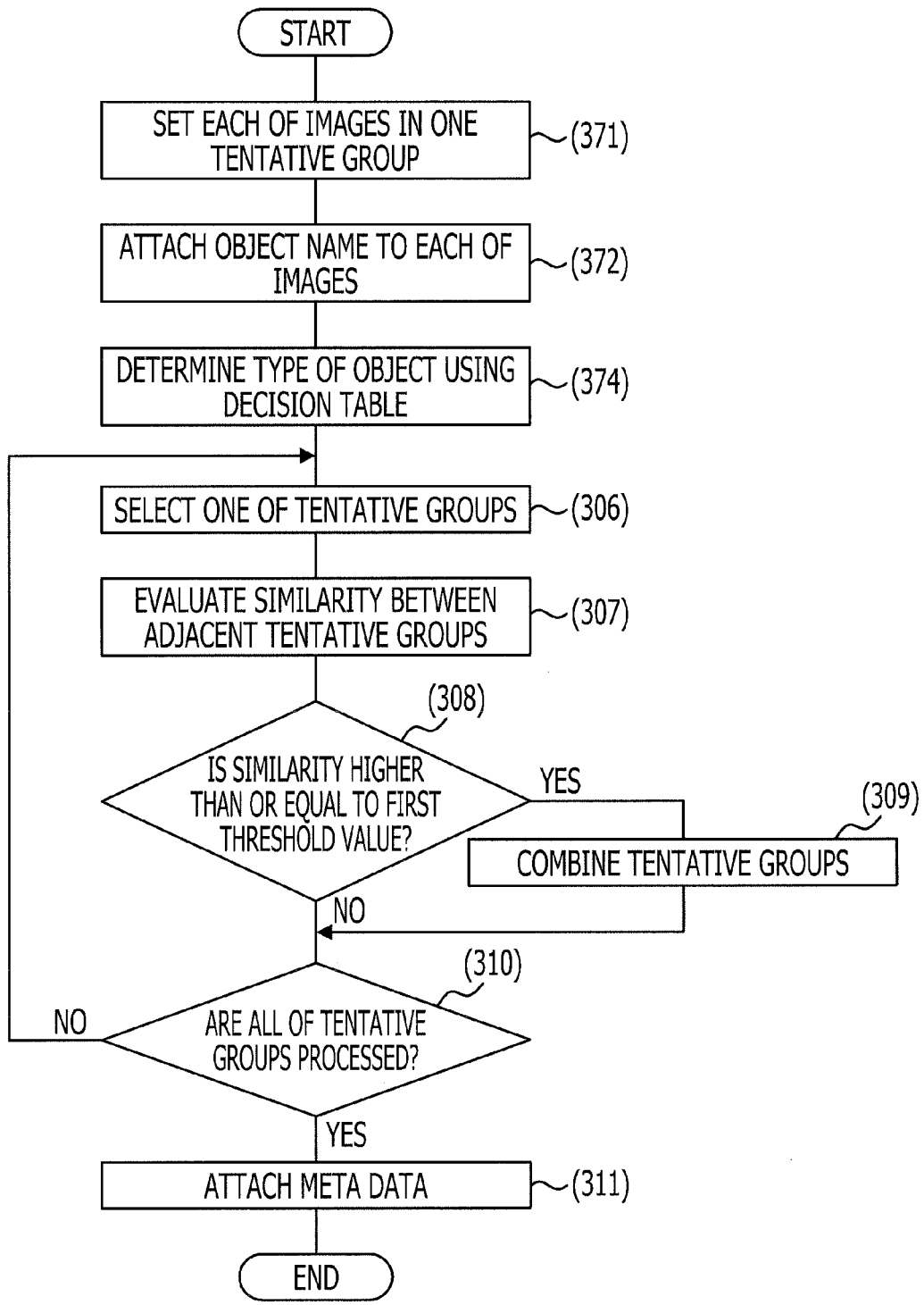
FIG. 15 is a first flowchart of another example of the image processing performed by the image processing device.

FIG. 14 illustrates a grouping process for an image information sequence. In addition, FIG. 15 is a flowchart of another example of the image processing performed by an image processing device. Note that the same numbering will be used in referring to the procedures in FIG. 15 as is utilized in describing FIG. 3, and the descriptions of the procedures are not repeated.

In the example illustrated in FIG. 14, the image processing device 1 considers the still images included in the image information sequence as different tentative groups. That is, the image processing device 1 sets each of the still images included in the input image information sequence in one of the different tentative groups (operation 371 in FIG. 16). Note that if time information is recorded in each of the image information items included in video data, the above-described term "frame" may be replaced with the term "still image". However, if time information is not recorded in each of the image information items included in the video data, image information items included in the frames of the video data may be regarded as a sequence of still images.

Subsequently, the image processing device 1 attaches an object name to each of the images of objects recorded in each of the still images (operation 372). In the example illustrated in FIG. 14, a list of object names attached to the images of objects recorded in each of the still images is illustrated.

Subsequently, the image processing device 1 determines whether each of the images of the objects having the object names in each of the still images indicates a background object or a foreground object using the decision table illustrated in FIG. 9B (operation 374). Through the processes up to operation 374, the image processing device 1 generates an object table for each of the tentative groups including only one still image. The object table includes an object name recorded in the image information item included in the tentative group and the result of determination. In addition, the image processing device 1 stores the object table generated for each of the tentative groups in association with the tentative group, where the storage unit 117 stores the image data of each of the still images, object identification information for identifying an object included in the image data, and the location information for identifying the location of the object in the image data in association with one another.

The image processing device 1 may perform a process for combining the combinable tentative groups and forming a final group on the basis of the object table as in the above-described processes from operations 306 to 310. In the example illustrated in FIG. 14, the image processing device 1 combines tentative groups 1 and 2 and forms a final group 1 on the basis of the similarity of the object having the object name A that is common to the tentative groups 1 and 2. Similarly, the image processing device 1 combines tentative groups 3 to 7 and forms a final group 2 on the basis of the similarity of the object having the object name C that is common to the tentative groups 3 to 7. Note that in the example illustrated in FIG. 14, in the image processing device 1, the similarity between an object having the object name C included in a tentative group 8 and an object having the object name C that is common to the tentative groups 3 to 7 which are combined when the final group 2 is formed is low.

As described above, in the image processing technology according to the present embodiment, a sequence of still images continuously captured may be separated into ranges each representing the progress of one of the events, and meta data that indicates the event may be attached to each of the ranges.

In addition, audio information recorded in the video data in association with the image information may be used in the meta data attaching process of the image processing technology according to the present embodiment.

For example, the image processing device 1 may extract a value indicating the volume of audio information for each of the tentative groups as an auxiliary object. Thereafter, the image processing device 1 may detect a change in the captured scene on the basis of the volume of noise in the environment by taking into account the commonality between the auxiliary objects corresponding to such audio information.

Furthermore, the image processing device 1 may extract information indicating the feature of audio information, such as a frequency spectrum as an object corresponding to the audio information. Still furthermore, the image processing device 1 may construct an audio recognition model that outputs audio identification information used for identifying the audio information on the basis of the feature of the audio information. Thereafter, the image processing device 1 may extract the operating noise or the alarm sound as an object that is equivalent to an object image using the audio recognition model. The image processing device 1 may attach an object name to such an extracted object corresponding to the operating noise or the alarm sound. Thereafter, like an object image, the image processing device 1 may use the object corresponding to the operating noise or the alarm sound for evaluation of the similarity between tentative groups.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non transitory computer-readable storage medium storing an image processing program that causes a computer to execute a process comprising:
    acquiring the same object identification information included in a plurality of image data items by referring to a storage unit that stores each of the image data items, object identification information that identifies an object included in the image data item, and a location information item that identifies a location of the object in the image data item in association with one another;
    acquiring the location of the object identified by the acquired object identification information in each of the image data items by referring to the storage unit;
    computing a difference between the acquired location information items;
    comparing the difference between the location information items with a predetermined location threshold value;
    determining whether the image data items are to be in the same group on the basis of a result of comparison of the difference between the location information items and the predetermined location threshold value;
    referring to correspondence information that is further stored in the storage unit and that indicates a correspondence between event identification information for identifying an event and background object identification information for identifying an object that indicates a situation of the image data item and that is included in the image data item indicating the event to identify the background object identification information that is coincident with the acquired object identification information;
    acquiring event identification information stored in the storage unit in association with the identified background object identification information; and
    storing, in the storage unit, the plurality of image data items that are determined to be in the same group in the determining whether the image data items are to be in the same group in association with the acquired event identification information.

2. The computer-readable storage medium according to claim 1, the program causing the computer to execute the process further comprising:
    acquiring a feature of an object identified by the acquired object identification information from each of the image data items by referring to the storage unit;
    computing a difference between the acquired features;
    comparing the difference between the features with a predetermined coincidence determination threshold value; and
    determining whether the image data items are to be in the same group on the basis of a result of comparison of the difference between the features and the predetermined coincidence determination threshold value.

3. The computer-readable storage medium according to claim 2, the program causing the computer to execute the process further comprising:
    acquiring a plurality of the same object identification information items included in the plurality of image data items on the basis of the plurality of object identification information items for identifying a plurality of objects included in the image data items further stored in the storage unit;
    acquiring location information items regarding objects identified by the acquired object identification information items for each of the image data items by referring to the storage unit;
    computing a difference between the acquired location information items for each of the objects;
    comparing the difference between the location information items with a predetermined threshold value for each of the objects; and
    determining whether the image data items are to be in the same group on the basis of a result of comparison of the difference between the location information items and the predetermined threshold value for each of the objects.

4. The computer-readable storage medium according to claim 3, the program causing the computer to execute the process further comprising:
    further referring to foreground object identification information that is further stored in the storage unit in association with event identification information for identifying an event and that indicates an object other than an object indicated by background object identification information to further identify the foreground object identification information that is coincident with object identification information other than the acquired object identification information included in the image data items;
    acquiring the event identification information stored in the storage unit in association with the identified background object identification information and the identified foreground object identification information; and
    storing, in the storage unit, the plurality of image data items that are determined to be in the same group in the determining whether the image data items are to be in the same group in association with the acquired event identification information.

5. The computer-readable storage medium according to claim 3, the program causing the computer to execute the process further comprising:
    using time information regarding image capture times of the image data items further stored in the storage unit in association with the image data items to acquire the image data items having a difference between the image capture times within a predetermined period of time;
    acquiring the same object identification information included in a predetermined number or more of the image data items among the acquired image data items;
    acquiring a location information item regarding a location of an object identified by the acquired object identification information for each of the image data items by referring to the storage unit;
    computing a difference between the acquired location information items;

comparing the difference between the location information items with a predetermined location threshold value; and determining whether the image data items are to be in the same group on the basis of a result of the comparison of the difference between the location information items and the predetermined location threshold value.

6. The computer-readable storage medium according to claim 2, the program causing the computer to execute the process further comprising:

further referring to foreground object identification information that is further stored in the storage unit in association with event identification information for identifying an event and that indicates an object other than an object indicated by background object identification information to further identify the foreground object identification information that is coincident with object identification information other than the acquired object identification information included in the image data items;

acquiring the event identification information stored in the storage unit in association with the identified background object identification information and the identified foreground object identification information; and storing, in the storage unit, the plurality of image data items that are determined to be in the same group in the determining whether the image data items are to be in the same group in association with the acquired event identification information.

7. The computer-readable storage medium according to claim 2, the program causing the computer to execute the process further comprising:

using time information regarding image capture times of the image data items further stored in the storage unit in association with the image data items to acquire the image data items having a difference between the image capture times within a predetermined period of time;

acquiring the same object identification information included in a predetermined number or more of the image data items among the acquired image data items;

acquiring a location information item regarding a location of an object identified by the acquired object identification information for each of the image data items by referring to the storage unit;

computing a difference between the acquired location information items;

comparing the difference between the location information items with a predetermined location threshold value; and determining whether the image data items are to be in the same group on the basis of a result of the comparison of the difference between the location information items and the predetermined location threshold value.

8. The computer-readable storage medium according to claim 1, the program causing the computer to execute the process further comprising:

acquiring a plurality of the same object identification information items included in the plurality of image data items on the basis of the plurality of object identification information items for identifying a plurality of objects included in the image data items further stored in the storage unit;

acquiring location information items regarding objects identified by the acquired object identification information items for each of the image data items by referring to the storage unit;

computing a difference between the acquired location information items for each of the objects;

comparing the difference between the location information items with a predetermined threshold value for each of the objects; and determining whether the image data items are to be in the same group on the basis of a result of comparison of the difference between the location information items and the predetermined threshold value for each of the objects.

9. The computer-readable storage medium according to claim 8, the program causing the computer to execute the process further comprising:

further referring to foreground object identification information that is further stored in the storage unit in association with event identification information for identifying an event and that indicates an object other than an object indicated by background object identification information to further identify the foreground object identification information that is coincident with object identification information other than the acquired object identification information included in the image data items;

acquiring the event identification information stored in the storage unit in association with the identified background object identification information and the identified foreground object identification information; and storing, in the storage unit, the plurality of image data items that are determined to be in the same group in the determining whether the image data items are to be in the same group in association with the acquired event identification information.

10. The computer-readable storage medium according to claim 8, the program causing the computer to execute the process further comprising:

using time information regarding image capture times of the image data items further stored in the storage unit in association with the image data items to acquire the image data items having a difference between the image capture times within a predetermined period of time;

acquiring the same object identification information included in a predetermined number or more of the image data items among the acquired image data items;

acquiring a location information item regarding a location of an object identified by the acquired object identification information for each of the image data items by referring to the storage unit;

computing a difference between the acquired location information items;

comparing the difference between the location information items with a predetermined location threshold value; and determining whether the image data items are to be in the same group on the basis of a result of the comparison of the difference between the location information items and the predetermined location threshold value.

11. The computer-readable storage medium according to claim 1, the program causing the computer to execute the process further comprising:

further referring to foreground object identification information that is further stored in the storage unit in association with event identification information for identifying an event and that indicates an object other than an object indicated by background object identification information to further identify the foreground object identification information that is coincident with object identification information other than the acquired object identification information included in the image data items;

acquiring the event identification information stored in the storage unit in association with the identified background object identification information and the identified foreground object identification information; and storing, in the storage unit, the plurality of image data items that are determined to be in the same group in the determining whether the image data items are to be in the same group in association with the acquired event identification information.

12. The computer-readable storage medium according to claim 11, the program causing the computer to execute the process further comprising:

using time information regarding image capture times of the image data items further stored in the storage unit in association with the image data items to acquire the image data items having a difference between the image capture times within a predetermined period of time;

acquiring the same object identification information included in a predetermined number or more of the image data items among the acquired image data items;

acquiring a location information item regarding a location of an object identified by the acquired object identification information for each of the image data items by referring to the storage unit;

computing a difference between the acquired location information items;

comparing the difference between the location information items with a predetermined location threshold value; and determining whether the image data items are to be in the same group on the basis of a result of the comparison of the difference between the location information items and the predetermined location threshold value.

13. The computer-readable storage medium according to claim 1, the program causing the computer to execute the process further comprising:

using time information regarding image capture times of the image data items further stored in the storage unit in association with the image data items to acquire the image data items having a difference between the image capture times within a predetermined period of time;

acquiring the same object identification information included in a predetermined number or more of the image data items among the acquired image data items;

acquiring a location information item regarding a location of an object identified by the acquired object identification information for each of the image data items by referring to the storage unit;

computing a difference between the acquired location information items;

comparing the difference between the location information items with a predetermined location threshold value; and determining whether the image data items are to be in the same group on the basis of a result of the comparison of the difference between the location information items and the predetermined location threshold value.

* * * * *